United States Patent
Kim

(10) Patent No.: US 10,904,189 B2
(45) Date of Patent: Jan. 26, 2021

(54) TERMINAL AND METHOD FOR DISPLAYING PREVIOUS CONVERSATION INFORMATION WHILE DISPLAYING MESSAGE OF CURRENT CONVERSATION AT THE TERMINAL

(71) Applicant: LG ELECTRONICS INC., Seoul (KR)

(72) Inventor: Jaewoon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 222 days.

(21) Appl. No.: 15/510,677

(22) PCT Filed: Jan. 12, 2015

(86) PCT No.: PCT/KR2015/000293
§ 371 (c)(1),
(2) Date: Mar. 10, 2017

(87) PCT Pub. No.: WO2016/039509
PCT Pub. Date: Mar. 17, 2016

(65) Prior Publication Data
US 2017/0289085 A1 Oct. 5, 2017

(30) Foreign Application Priority Data
Sep. 11, 2014 (KR) .................. 10-2014-0120282

(51) Int. Cl.
*G06F 15/16* (2006.01)
*H04L 12/58* (2006.01)
(Continued)

(52) U.S. Cl.
CPC .............. *H04L 51/16* (2013.01); *H04L 51/20* (2013.01); *H04L 67/20* (2013.01); *H04W 4/12* (2013.01);
(Continued)

(58) Field of Classification Search
CPC ........ H04W 4/12; H04W 88/02; H04L 51/16; H04L 51/20; H04L 67/20; H04M 1/72552; G06Q 10/10
(Continued)

(56) References Cited

U.S. PATENT DOCUMENTS

2009/0024710 A1* 1/2009 Danker ............. H04M 3/42382
709/206
2009/0239558 A1* 9/2009 Choi ................... H04L 12/1831
455/466
(Continued)

FOREIGN PATENT DOCUMENTS

KR    10-0862142      10/2008
KR    10-2009-0123342 12/2009
(Continued)

OTHER PUBLICATIONS

PCT International Application No. PCT/KR2015/000293, International Search Report dated Jun. 5, 2015, 4 pages.

*Primary Examiner* — Dustin Nguyen
*Assistant Examiner* — Hao H Nguyen
(74) *Attorney, Agent, or Firm* — Lee, Hong, Degerman, Kang & Waimey

(57) ABSTRACT

A terminal according to an embodiment of the present invention displays at least one message, and obtains, on the basis of at least one of the displayed at least one message and terminal information of the terminal, at least one of: previous dialog information regarding the contents of a previous dialog with another party that corresponds to at least one message; and recommendation information which is information related to the contents of at least one message. In addition, the terminal displays at least one of the obtained previous dialog information and the obtained recommendation information.

22 Claims, 31 Drawing Sheets

(51) Int. Cl.
    *H04W 4/12*               (2009.01)
    *H04L 29/08*            (2006.01)
    *H04W 88/02*           (2009.01)
    *G06F 3/0481*          (2013.01)
    *G06F 3/0485*          (2013.01)
    *G06F 3/0488*          (2013.01)

(52) U.S. Cl.
    CPC .......... *G06F 3/0481* (2013.01); *G06F 3/0485* (2013.01); *G06F 3/0488* (2013.01); *H04W 88/02* (2013.01)

(58) Field of Classification Search
    USPC ......... 709/203–207; 715/739, 751–753, 758; 455/412, 2.1, 414.1, 466
    See application file for complete search history.

(56) References Cited

U.S. PATENT DOCUMENTS

| | | | | |
|---|---|---|---|---|
| 2009/0298476 | A1* | 12/2009 | Choi | G06Q 10/107 455/412.2 |
| 2010/0081463 | A1* | 4/2010 | Song | H04M 1/72552 455/466 |
| 2012/0260189 | A1* | 10/2012 | Howard | H04L 51/16 715/739 |
| 2013/0007137 | A1* | 1/2013 | Azzam | H04L 51/16 709/206 |
| 2014/0052794 | A1* | 2/2014 | Tucker | G06Q 50/01 709/206 |
| 2014/0067842 | A1* | 3/2014 | Chen | G06F 16/24 707/758 |
| 2014/0351350 | A1* | 11/2014 | Lee | H04M 1/72569 709/206 |
| 2015/0032724 | A1* | 1/2015 | Thirugnanasundaram | H04L 51/32 707/722 |
| 2015/0082201 | A1* | 3/2015 | Sung | H04L 12/1831 715/753 |
| 2015/0304440 | A1* | 10/2015 | Zheng | H04L 67/26 717/177 |
| 2018/0125019 | A1* | 5/2018 | Colli | A01G 25/092 |
| 2018/0165582 | A1* | 6/2018 | Cha | G06N 20/00 |
| 2018/0205679 | A1* | 7/2018 | Melzer | G06Q 30/0251 |
| 2018/0212190 | A1* | 7/2018 | Son | H01L 27/3276 |

FOREIGN PATENT DOCUMENTS

| | | | |
|---|---|---|---|
| KR | 10-2010-0036578 | | 4/2010 |
| KR | 10-2014-0022355 | | 2/2014 |
| KR | 20140022355 | * | 2/2014 ......... G06Q 30/0267 |

\* cited by examiner

TERMINAL AND METHOD FOR DISPLAYING PREVIOUS CONVERSATION INFORMATION WHILE DISPLAYING MESSAGE OF CURRENT CONVERSATION AT THE TERMINAL

CROSS-REFERENCE TO RELATED APPLICATIONS

This application is the National Stage filing under 35 U.S.C. 371 of International Application No. PCT/KR2015/000293, filed on Jan. 12, 2015, which claims the benefit of earlier filing date and right of priority to Korean Application No. 10-2014-0120282, filed on Sep. 11, 2014, the contents of which are all hereby incorporated by reference herein in their entirety.

TECHNICAL FIELD

The present invention relates to a terminal and an operating method thereof, and more particularly, to a terminal capable of providing previous conversation information and recommendation information, which are related to an ongoing conversation, based on contents of a displayed message and terminal information.

BACKGROUND ART

Terminals may be generally classified as mobile/portable terminals or stationary terminals according to their mobility. Mobile terminals may also be classified as handheld terminals or vehicle mounted terminals according to whether or not a user can directly carry the terminal.

As functions of the terminals are diversified, the terminals are implemented into multimedia players provided with complex functions for photography, playback of music or video, game play, broadcast reception, and the like.

Meanwhile, a user of a terminal uses various contents by using the terminal, and may communicate messages using voices and characters with another user by using the terminal.

Recently, a frequency at which a user uses various message services using a terminal has increased as compared with that voice call services using the terminal.

However, there is a limitation that the terminal merely distinguishes messages transmitted and received by the user from each other to be displayed, and does not provide information related to contents of a currently ongoing conversation. Therefore, there is an inconvenience that, in order to search information related to the currently ongoing conversation, the user of the terminal should search contents of past conversations or search the related information on another screen instead of a message window.

Accordingly, a terminal and an operating method thereof are required, in which a user of a terminal can easily receive information related to a currently ongoing conversation.

DISCLOSURE OF THE INVENTION

Technical Problem

An embodiment of the present invention provides a terminal and an operating method thereof, which can provide previous conversation information and recommendation information, which are related to a currently ongoing conversation.

Also, an embodiment of the present invention provides a terminal and an operating method thereof, which can control an information display degree of an information window, based on a scroll speed of a user and a screen display elapsed time with respect to a screen on which the information window is displayed.

Technical Solution

According to an embodiment of the present invention, there is provided a method for operating a terminal, the method including: displaying at least one message; acquiring one or more of previous conversation information on previous conversation contents with a third party, corresponding to the at least one message, and recommendation information that is information related to contents of the at least one message, based on one or more of the at least one message and terminal information of the terminal; and displaying one or more of the acquired previous conversation information and recommendation information.

According to an embodiment of the present invention, there is provided a terminal including: a wireless communication unit; a display unit; a sensing unit configured to sense at least one of information in the terminal, peripheral environment information of the terminal, and information on a user of the terminal; and a controller configured to display at least one message on the display unit, acquire one or more of previous conversation information on previous conversation contents with a third party, corresponding to the at least one message, and recommendation information that is information related to contents of the at least one message, based on one or more of the at least one message and terminal information of the terminal, and display, on the display unit, one or more of the acquired previous conversation information and recommendation information.

Advantageous Effects

According to the embodiments of the present invention, a user can easily check previous conversation information and recommendation information, which are related to contents of a currently ongoing message.

Further, according to the embodiments of the present invention, a display degree of information displayed on a screen of a terminal can be controlled according to an interest degree of a user. Accordingly, information that a user desires to search can be easily searched.

MODE FOR CARRYING OUT THE INVENTION

Figure 1:
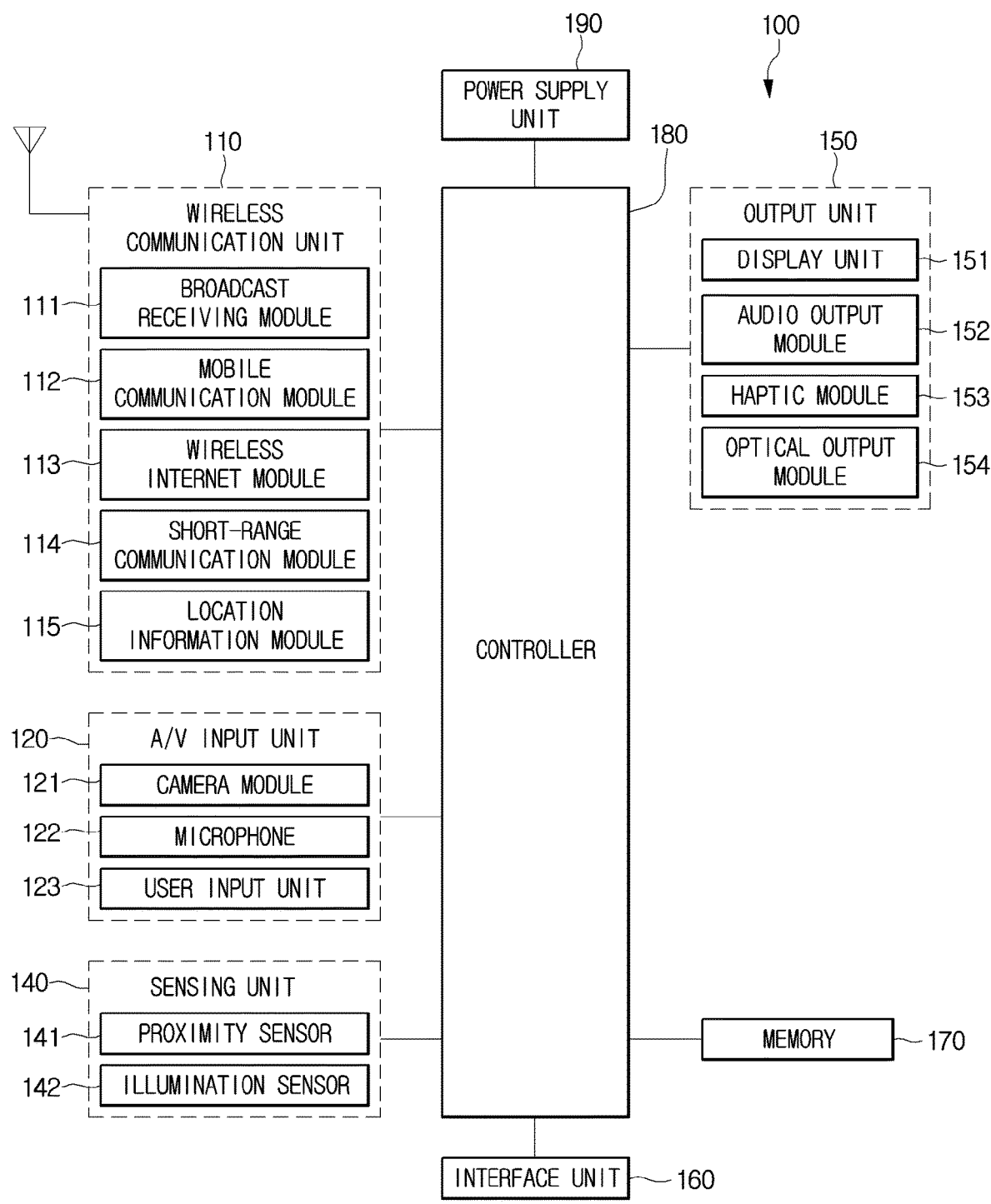
FIG. 1 is a block diagram of a terminal according to an embodiment of the present invention.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present invention, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present invention should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

The terminal 100 is shown having components such as a wireless communication unit 110, an audio/video (A/V) input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1, the terminal 100 is shown having wireless communication unit 110 configured with several commonly implemented components. For instance, the wireless communication unit 110 typically includes one or more components which permit wireless communication between the terminal 100 and a wireless communication system or network within which the mobile terminal is located.

The wireless communication unit 110 typically includes one or more modules which permit communications such as wireless communications between the terminal 100 and a wireless communication system, communications between the terminal 100 and another mobile terminal, communications between the terminal 100 and an external server. Further, the wireless communication unit 110 typically includes one or more modules which connect the terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The A/V input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the A/V input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 154, and an optical output module 154.

The display unit 151 may have an inter-layered structure or an integrated structure with a touch sensor in order to facilitate a touch screen. The touch screen may provide an output interface between the terminal 100 and a user, as well as function as the user input unit 123 which provides an input interface between the terminal 100 and the user.

The interface unit 160 serves as an interface with various types of external devices that can be coupled to the terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the terminal 100 may perform assorted control functions associated with a connected external device, in response to the external device being connected to the interface unit 160.

The memory 170 is typically implemented to store data to support various functions or features of the terminal 100. For instance, the memory 170 may be configured to store application programs executed in the terminal 100, data or instructions for operations of the terminal 100, and the like. Some of these application programs may be downloaded from an external server via wireless communication. Other application programs may be installed within the terminal 100 at time of manufacturing or shipping, which is typically the case for basic functions of the terminal 100 (for example, receiving a call, placing a call, receiving a message, sending a message, and the like). It is common for application programs to be stored in the memory 170, installed in the terminal 100, and executed by the controller 180 to perform an operation (or function) for the terminal 100.

The controller 180 typically functions to control overall operation of the terminal 100, in addition to the operations associated with the application programs. The controller 180 may provide or process information or functions appropriate for a user by processing signals, data, information and the like, which are input or output by the various components depicted in FIG. 1, or activating application programs stored in the memory 170. As one example, the controller 180 controls some or all of the components illustrated in FIG. 1 according to the execution of an application program that have been stored in the memory 170.

The controller 180 typically functions to control overall operation of the terminal 100, in addition to the operations associated with the application programs. The controller 180 may provide or process information or functions appropriate for a user by processing signals, data, information and the like, which are input or output by the various components depicted in FIG. 1, or activating application programs stored in the memory 160. As one example, the controller 180 controls some or all of the components illustrated in FIG. 1 according to the execution of an application program that have been stored in the memory 160.

The power supply unit 190 can be configured to receive external power or provide internal power in order to supply appropriate power required for operating elements and components included in the terminal 100. The power supply unit 190 may include a battery, and the battery may be configured to be embedded in the terminal body, or configured to be detachable from the terminal body.

At least some of the components may operate in cooperation with one another to implement operations, controls, or control methods of the terminal according to various embodiments described below. In addition, the operations, controls, or control methods of the terminal may be implemented by driving at least one application program stored in the memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the terminal 100 and a wireless communication system, communications between the terminal 100 and another terminal 100, or communications between the mobile terminal and a network where another terminal 100 (or an external server) is located, via wireless area networks. One example of the wireless area networks is a wireless personal area networks.

In some embodiments, another mobile terminal (which may be configured similarly to terminal 100) may be a wearable device, for example, a smart watch, a smart glass or a head mounted display (HMD), which is able to exchange data with the terminal 100 (or otherwise cooperate with the terminal 100). The short-range communication module 114 may sense or recognize the wearable device, and permit communication between the wearable device and the terminal 100. In addition, when the sensed wearable device is a device which is authenticated to communicate with the terminal 100, the controller 180, for example, may cause transmission of data processed in the terminal 100 to the wearable device via the short-range communication module 114. Hence, a user of the wearable device may use the data processed in the terminal 100 on the wearable device. For example, when a call is received in the terminal 100, the user may answer the call using the wearable device. Also, when a message is received in the terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The A/V input unit 120 may be configured to permit various types of input to the mobile 100. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the terminal 100. As another example, the cameras 121 may be located in a stereoscopic arrangement to acquire left and right images for implementing a stereoscopic image.

The microphone 122 is generally implemented to permit audio input to the terminal 100. The audio input can be processed in various manners according to a function being executed in the terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the terminal 100. The user input unit 123 may include one or more of a mechanical input element (for example, a key, a button located on a front and/or rear surface or a side surface of the terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the terminal 100. For example, the display unit 151 may display execution screen information of an application program executing at the terminal 100 or user interface (UI) and graphic user interface (GUI) information in response to the execution screen information.

The display unit 151 outputs information processed in the terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the terminal 100. The audio output module 152 may also be implemented as a receiver, a speaker, a buzzer, or the like.

An alarm unit 153 outputs a signal for notifying the occurrence of an event of the terminal 100. Examples of the event occurring in the terminal 100 are call signal receptions, message receptions, key signal inputs, touch inputs, and the like. The alarm unit 153 may output another type of signal other than a video signal or audio signal, e.g., a signal for notifying the occurrence of an event through vibration. The video signal or audio signal may be output through the audio output module 152, and therefore, the display unit 151 and the audio output module 152 may be classified as parts of the alarm unit 153.

A haptic module 154 can be configured to generate various tactile effects that a user feels, perceive, or otherwise experience. A typical example of a tactile effect generated by the haptic module 154 is vibration. The strength, pattern and the like of the vibration generated by the haptic module 154 can be controlled by user selection or setting by the controller. For example, the haptic module 154 may output different vibrations in a combining manner or a sequential manner.

Besides vibration, the haptic module 154 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 154 can also be implemented to allow the user to feel a tactile effect through a muscle sensation such as the user's fingers or arm, as well as transferring the tactile effect through direct contact. Two or more haptic modules 154 may be provided according to the particular configuration of the terminal 100.

The interface unit 160 serves as an interface for external devices to be connected with the terminal 100. For example, the interface unit 160 can receive data transmitted from an external device, receive power to transfer to elements and components within the terminal 100, or transmit internal data of the terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the terminal 100 or may serve as a passage to allow various command signals input by the user from the cradle to be transferred to the terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The terminal 100 may also be operated in relation to a network storage device that performs the storage function of the memory 170 over a network, such as the Internet.

The memory 160 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The terminal 100 may also be operated in relation to a network storage device that performs the storage function of the memory 160 over a network, such as the Internet.

The controller 180 may typically control the general operations of the terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The controller 180 may acquire contents of a displayed message and terminal use information of the user. The controller 180 may store, in the memory 170, the acquired contents of the message and the acquired terminal use information of the user. In addition, the controller 180 may acquire previous conversation information and recommendation information, which are related to contents of a currently ongoing message, and output the acquired previous conversation information and the acquire recommendation information through the output unit 150. This will be described later.

The power supply unit 190 receives external power or provides internal power and supply the appropriate power required for operating respective elements and components included in the terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

As a further alternative, the terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

Various embodiments described herein may be implemented in a computer-readable medium, a machine-readable medium, or similar medium using, for example, software, hardware, or any combination thereof.

Further preferred embodiments will be described in more detail with reference to additional drawing figures. It is understood by those skilled in the art that the present features can be embodied in several forms without departing from the characteristics thereof.

An operating method of the terminal according to the present invention will be described with reference to FIGS. 2 to 29.

Figure 2:
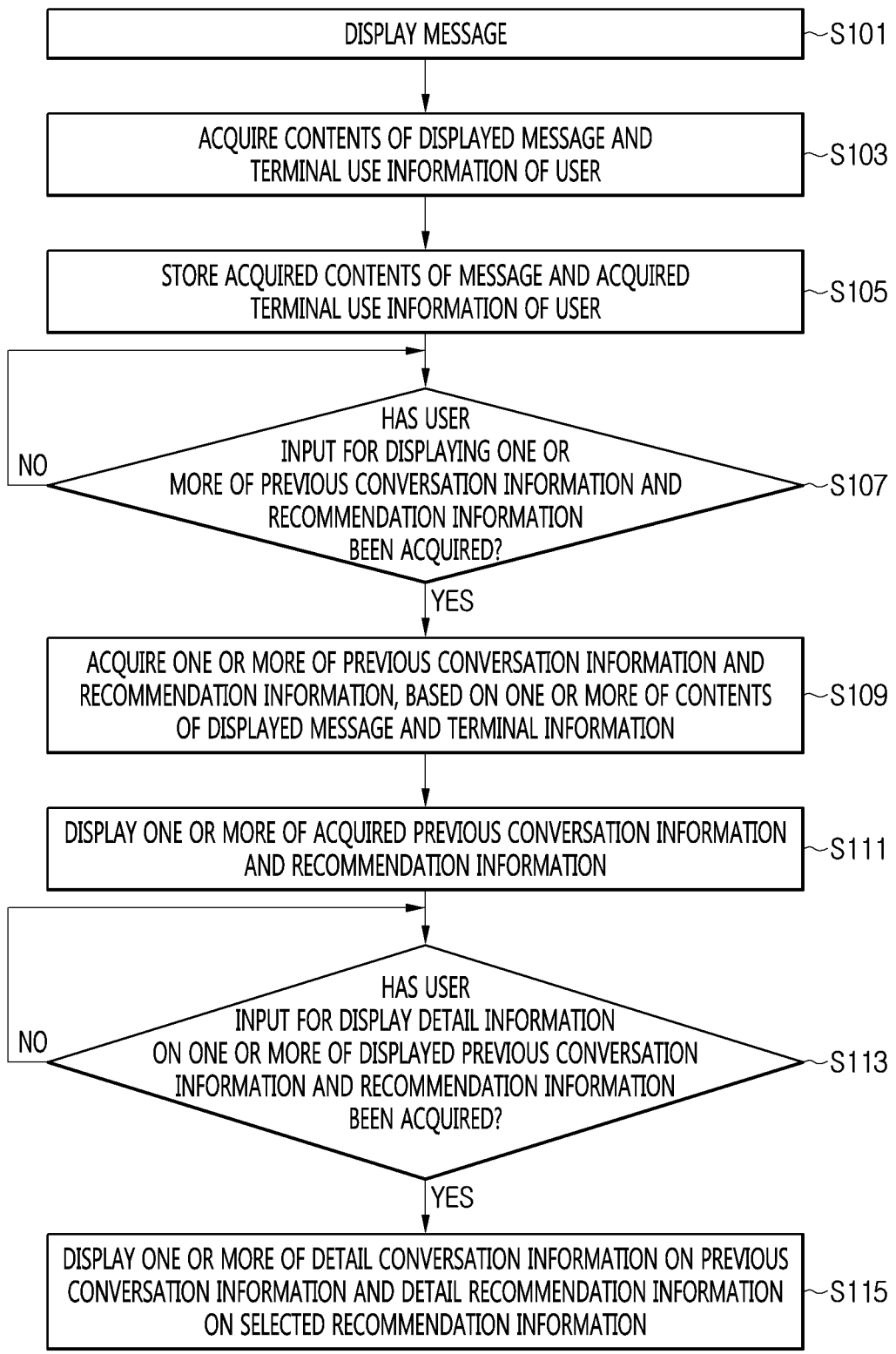
FIG. 2 is a flowchart illustrating an operating method of the terminal according to an embodiment of the present invention.

FIG. 2 is a flowchart illustrating an operating method of the terminal according to an embodiment of the present invention.

Referring to FIG. 2, the controller 180 of the terminal 100 displays at least one message using one or more of voices and characters (S101).

The controller 180 may output at least one message with another user through the output unit 150.

In an embodiment, the controller 180 may display character messages transmitted/received to/from another user on the display unit 151. The controller 180 may differently display a message transmitted by the user and a message received by the user, and may display the messages at different sides on a displayed screen.

Meanwhile, the message output by the controller 180 through the output unit 150 may be a message on a currently ongoing conversation with another user, and may be a message on a previous conversation.

The controller 180 of the terminal 100 acquires one or more of contents of the displayed message and terminal use information of the user (S103).

The controller 180 may acquire information on contents of a message output through the output unit 150. Specifically, the controller 180 may acquire information on contents of at least one message using one or more voices and characters, which is output through the output unit 150. In addition, the controller 180 may acquire only information on some of the contents of the output message.

In an embodiment, the controller 180 may acquire contents of a character message displayed on a screen through the display unit 151. The controller 180 may acquire contents of at least one message displayed on the screen, and may acquire only a specific keyword included in the message. Therefore, the controller 180 may acquire contents of all messages displayed on the screen, and may acquire only contents of frequently repeated keywords. In addition, the controller 180 may acquire only contents including a specific keyword among the at least one message displayed on the screen.

The controller 180 may acquire terminal use information of the user while a message is being displayed. Specifically, the controller 180 may acquire terminal use information on the use of the terminal of the user while a message is being output through the output unit 150. Here, the terminal use information may include information on one or more of a message transmission/reception time, a message check time, a geographical location of the terminal 100, an application executed through the terminal 100, an opened web page, an operation of another device connected to the terminal 100, an environment of an area in which the terminal 100 is located, and an emotion according to an expression of the user. Here, the environment of the area in which the terminal 100 is located may include a geographical environment, a cultural environment, and a weather environment.

In an embodiment, the controller 180 may acquire information on a geographical location of the terminal 100 while a message is being displayed. Therefore, the controller 180 may acquire information on a geographical location at which the displayed message is transmitted/received. In addition, the controller 180 may acquire information on a kind and operation contents of an application executed while a message is being displayed. Therefore, the controller 180 may acquire information on a kind and operation contents of an application executed through a screen identical to or different from that on which the message is being displayed. In addition, the controller 180 may acquire information on an emotion according to an expression of the user while a message is being displayed. The controller 180 may determine an emotion according to an expression of the user on the basis of an image of the user, acquired through the camera 121, and acquire information on the determined emotion of the user. In addition, the controller 180 may acquire information on a time when the user checks a message. Therefore, the controller 180 may acquire information on a time when the user checks the corresponding message and a time when the corresponding message is transmitted/received. In addition, the controller 180 may acquire information on an operation of another device connected to the terminal 100 while a message is being displayed. Therefore, the controller 180 may acquire information on operation contents of the other device connected to the terminal 100 and data transmitted from the other device to the terminal 100. In addition, the controller 180 may acquire information on a web page accessed while a message is being displayed. Therefore, the controller 180 may acquire information on a web page accessed through a screen identical to or different from that on which the message is being displayed. The information on the web page may include an address of the web page.

This will be described with reference to FIG. 3.

Figure 3:
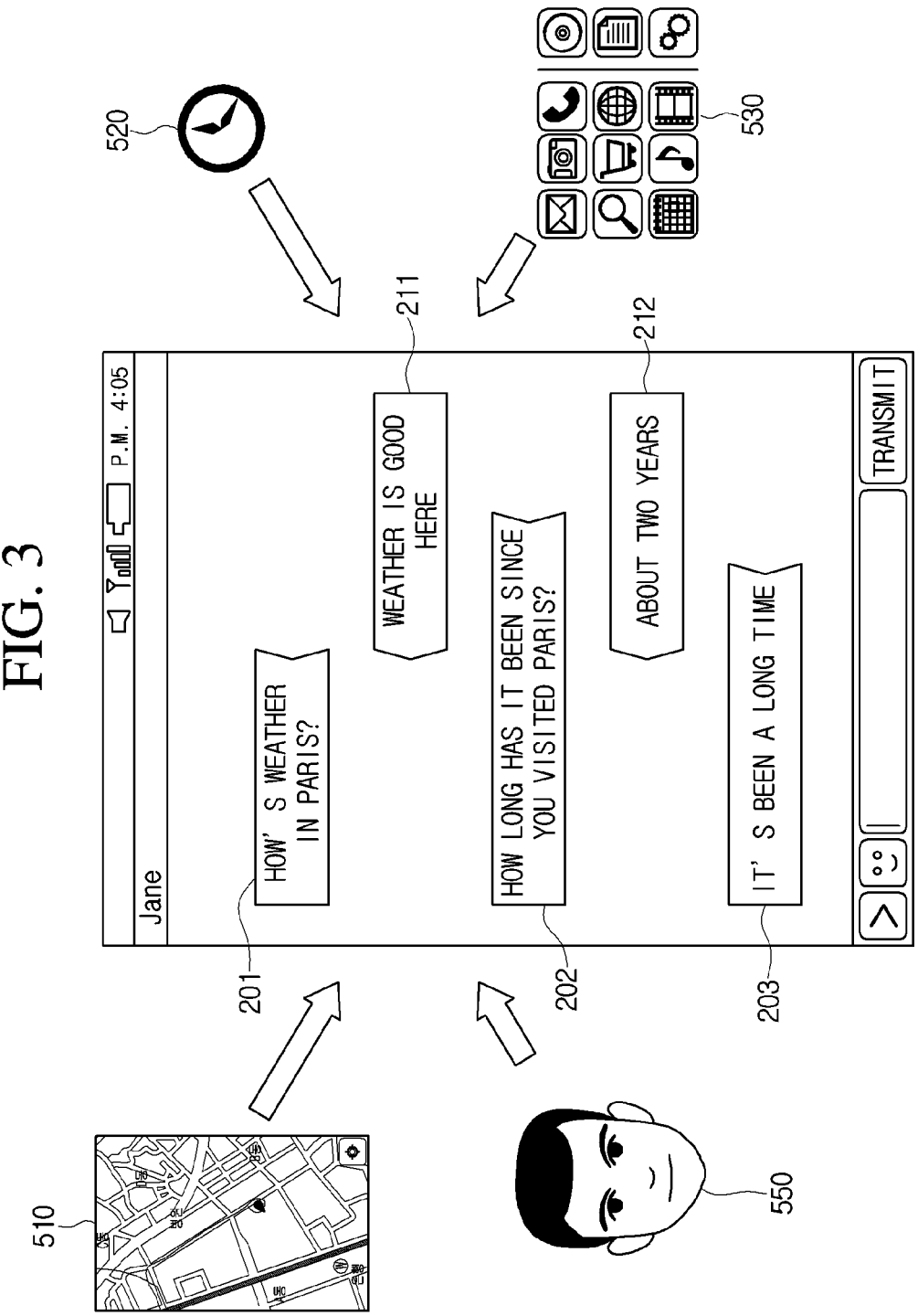
FIG. 3 is an exemplary view illustrating that contents of a message and terminal use information of a user are acquired according to an embodiment of the present invention.

FIG. 3 is an exemplary view illustrating that contents of a message and terminal use information of a user are acquired according to an embodiment of the present invention.

Referring to FIG. 3, the controller 180 may display one or more character messages with another user on a screen of the display unit 151. The controller 180 may acquire information on message contents from one or more of messages 201, 202, and 203 received from the other user and messages 211 and 212 transmitted to the other user. For example, the controller 180 may acquire a keyword such as 'Paris,' 'weather,' How long,' or 'two years,' which is a specific keyword, from the displayed messages 201, 202, 203, 211, and 212. The controller 180 may acquire information 510 on a geographical location of the terminal 100 while the messages 201, 202, 203, 211, and 212 are being displayed. The controller 180 may acquire information 520 on a time while the messages 201, 202, 203, 211, and 212 are being displayed. The controller 180 may acquire information 530 on a kind and operation contents of an application executed in the terminal 100 while the messages 201, 202, 203, 211, and 212 are being displayed. The controller 180 may acquire information 550 on an emotion according to an expression of the user of the terminal 100 while the messages 201, 202, 203, 211, and 212 are being displayed.

The acquisition of the contents of the message and the terminal use information of the user is an example for description. However, the present invention is not limited thereto, and the acquisition of the contents of the message and the terminal use information of the user may be variously set according to selections of a user or a designer.

Meanwhile, the case where a message is being displayed includes a case where the corresponding message is being displayed on a screen of the terminal 100, and may mean no more than a certain time from before/after the point of time when the corresponding message is displayed on the screen.

Again, FIG. 2 will be described.

The controller 180 of the terminal 100 stores one or more of the acquired contents of the message and the acquired terminal use information of the user (S105).

The controller 180 may store one or more of the acquired contents of the message and the acquired terminal use information of the user in the memory 170. In addition, the controller 180 may store one or more of the acquired contents of the message and the acquired terminal use information of the user in a server connected through the wireless communication unit 110.

In an embodiment, the controller 180 may store the acquired contents of the message, corresponding to the acquired terminal use information of the user. Therefore, the controller 180 may store the acquired contents of the message to be matched the acquired terminal use information of the user while the acquired contents of the message are being displayed.

Meanwhile, the controller 180 may classify and store one or more of the acquired contents of the message and the acquired terminal use information of the user as one or more preset categories. For example, the controller 180 may classify and store one or more of the acquired contents of the message and the acquired terminal use information of the user as a category corresponding to a keyword according to the acquired contents of the message. In addition, the controller 180 may classify and store one or more of the acquired contents of the message and the acquired terminal use information of the user as a category corresponding to the acquired terminal use information of the user. Therefore, the controller 180 may classify and store one or more of the acquired contents of the message and the acquired terminal use information of the user a category corresponding to one or more of a message transmission/reception time, a message check time, a geographical location of the terminal 100, an application executed through the terminal 100, an opened web page, an operation of another device connected to the terminal 100, an environment of an area in which the terminal 100 is located, and an emotion according to an expression of the user.

If a user input for displaying one or more of previous conversation information and recommendation information is acquired (S107), the controller 180 of the terminal 100 acquires one or more of previous conversation information and recommendation information, based on one or more of contents of a currently displayed message and terminal information (S109).

If a user input for displaying one or more of previous conversation information and recommendation information, corresponding to the displayed message, the controller 180 may acquire one or more of previous conversation information and recommendation information, which are related to a currently displayed message, based on contents of the currently displayed message and terminal information. For example, the controller 180 may acquire one or more of previous conversation information and recommendation information, corresponding to a keyword included in the displayed message and a current geographical location of the terminal 100, based on the keyword and the current geographical location.

In an embodiment, when the current geographical location of the terminal 100 is area A, and the other party corresponding to the displayed message is user X, the controller 180 may acquire, as the previous conversation information, contents of a previous conversation in which the area A is included in the terminal use information among contents of previous conversations with the user X.

Here, the previous conversation information may mean a message using one or more of voices and characters, which the user transmits/receives to/from another user through the terminal 100.

In addition, the recommendation information may mean information related to contents of a currently displayed message. For example, the recommendation information may be information corresponding to a keyword of the currently displayed message.

In addition, the terminal information is information related to a current state and operation of the terminal 100, and may include information on one or more of a kind and operation contents of an application being executed in the terminal 100 and a kind and operation contents of another device connected to the terminal 100. Here, the environment of the area in which the terminal 100 is located may include a geographical environment, a cultural environment, and a weather environment.

The controller 180 may acquire a user input for displaying one or more of previous conversation information and recommendation information through a touch sensor. In addition, the controller 180 may acquire a user input for displaying one or more of previous conversation information and recommendation information through the user input unit 123 such as a keypad or jog wheel.

Meanwhile, the controller 180 may acquire a user input for automatically or manually searching one or more of previous conversation information and recommendation information, corresponding to one or more of contents of a plurality of currently displayed messages.

This will be described with reference to FIGS. 4 and 5.

Figure 4:
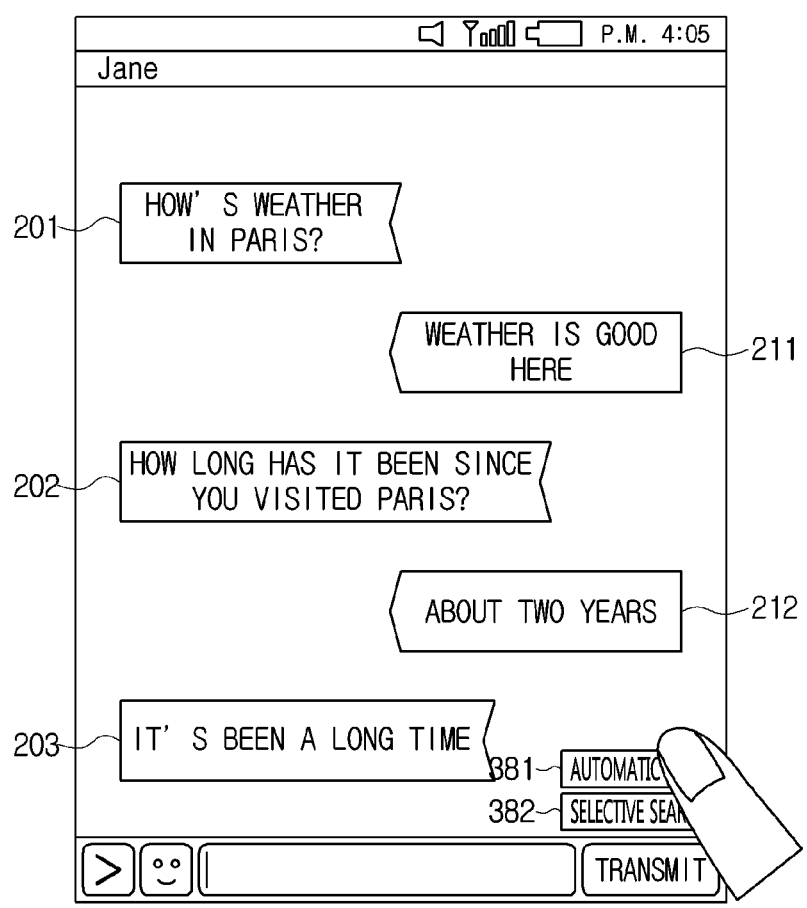
FIG. 4 is an exemplary view illustrating an automatic search input screen according to an embodiment of the present invention.

FIG. 4 is an exemplary view illustrating an automatic search input screen according to an embodiment of the present invention.

Referring to FIG. 4, the controller 180 may acquire a user input for touching an automatic search button 381 as a user input for automatically searching one or more of previous conversation information and recommendation information, which correspond to contents of a currently displayed message. If a user input for automatically searching one or more of previous conversation information and recommendation information, which correspond to contents of a currently displayed message, the controller 180 may acquire one or more of previous conversation information and recommendation information, which correspond to the contents of the message, based on contents of one or more messages 201, 202, 203, 211, and 212 displayed on a screen. For example, the controller 180 may acquire one or more of previous conversation information and recommendation information, which correspond to the contents of the message, based on contents of all of the messages 201, 202, 203, 211, and 212 displayed on the screen. In addition, the controller 180 may acquire one or more of previous conversation information and recommendation information, which correspond to the contents of the message, based on some keywords of all of the messages 201, 202, 203, 211, and 212 displayed on the screen.

The controller 180 may acquire a user input for manually searching one or more of previous conversation information and recommendation information, which correspond to one or more of contents of a plurality of currently displayed message.

Figure 5A:
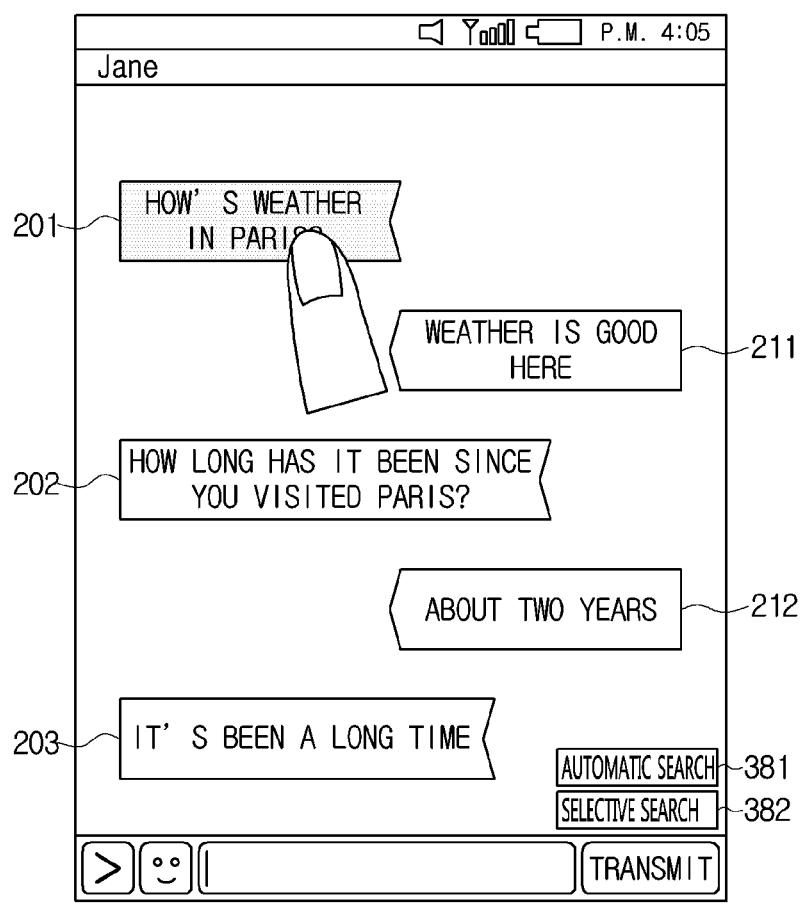
FIGS. 5A and 5B are exemplary views of a manual search input screen according to an embodiment of the present invention.
Figure 5B:
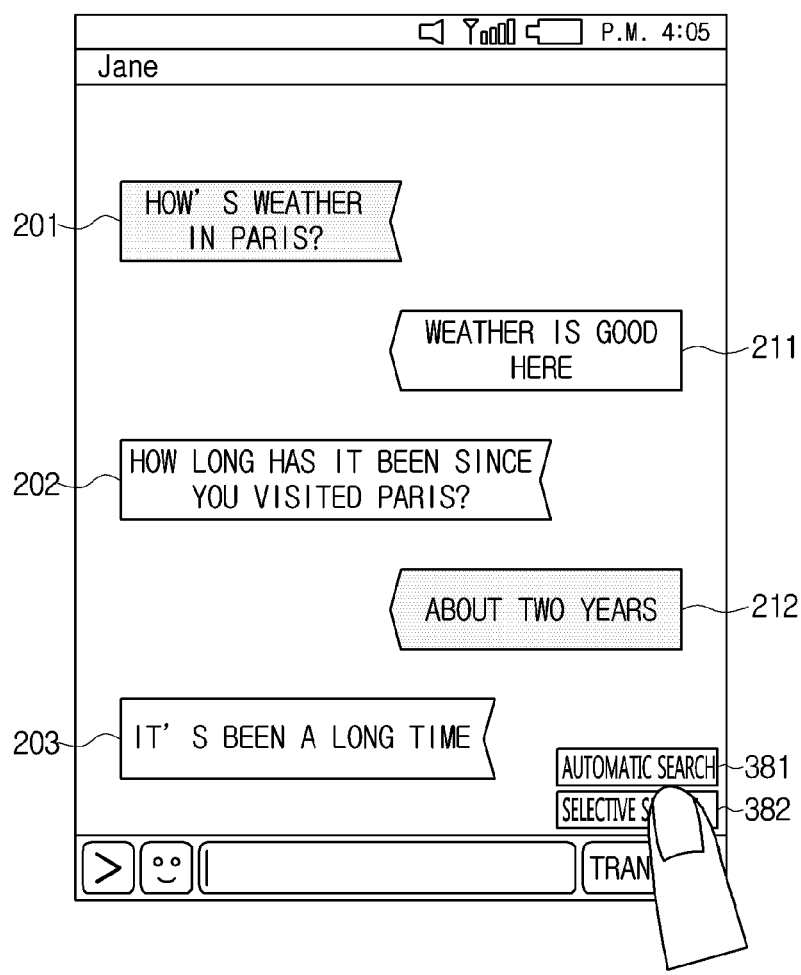

FIGS. 5A and 5B are exemplary views of a manual search input screen according to an embodiment of the present invention.

Referring to FIG. 5A, the controller 180 may acquire a user input for selecting one or more of one or more messages 201, 202, 203, 211, and 212 displayed on a screen. The controller 180 may display a message 201 selected by the user differently from the other messages 202, 203, 211, and 212.

Referring to FIG. 5B, the controller 180 may acquire a user input for touching a selective search button 382 as a user input for acquiring previous conversation information and recommendation information, which correspond to selected messages 201 and 211 among the one or more messages 201, 202, 203, 211, and 212 displayed on the screen. Therefore, the controller 180 may acquire one or more of the previous conversation information and the recommendation information, which correspond to the selected messages 201 and 211 among the one or more messages 201, 202, 203, 211, and 212 displayed on the screen. For example, the controller 180 may acquire one or more of previous conversation information and recommendation information, which correspond to the contents of the messages, based on one or more of contents of the selected messages 201 and 211 and terminal information. In addition, the controller 180 may acquire one or more of previous conversation information and recommendation information, which correspond to the contents of the messages, based on some keywords of the selected messages 201 and 211.

Meanwhile, the controller 180 may acquire a user input for scrolling a screen on which a message is displayed as a user input for displaying one or more of previous conversation information and recommendation information, which correspond to the display message.

This will be described with reference to FIG. 6.

Figure 6:
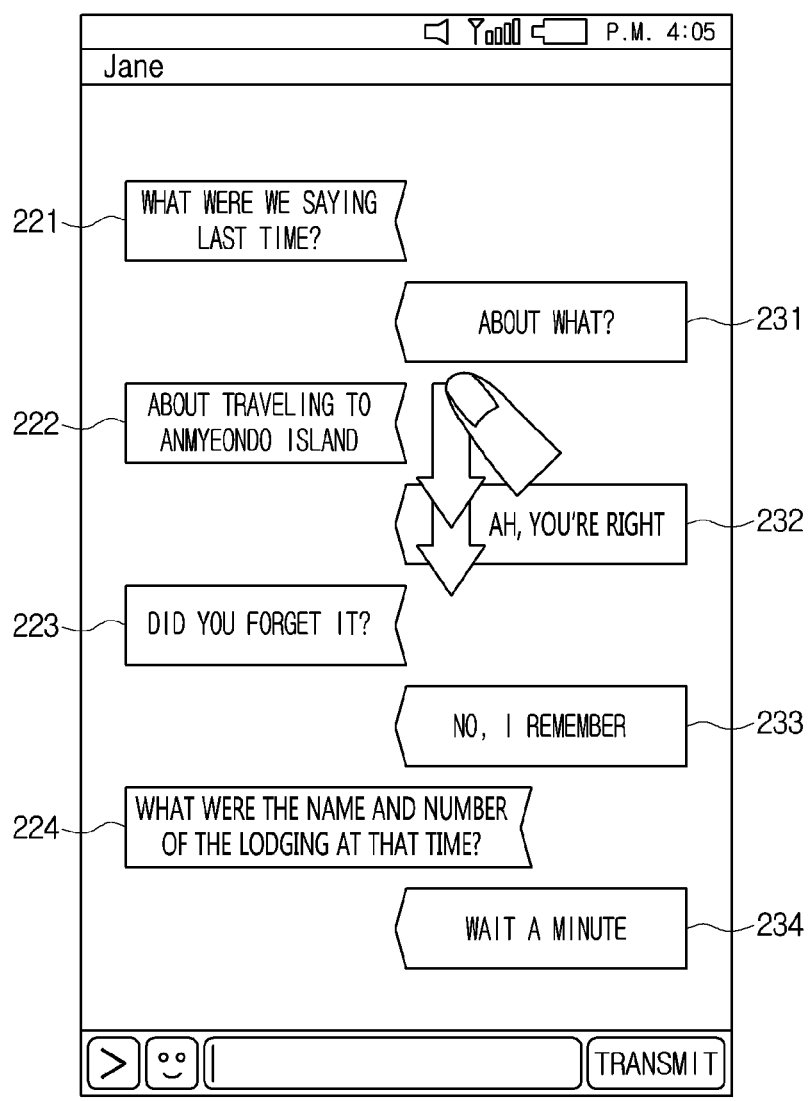
FIG. 6 is an exemplary view illustrating a user input for displaying one or more of previous conversation information and recommendation information according to an embodiment of the present invention.

FIG. 6 is an exemplary view illustrating a user input for displaying one or more of previous conversation information and recommendation information according to an embodiment of the present invention.

Referring to FIG. 6, the controller 180 may acquire a user input for scrolling a screen on which one or more messages 221, 222, 223, 224, 231, 232, 233, and 234 are displayed as a user input for displaying one or more of previous conversation information and recommendation information. As an example, the controller 180 may acquire a user input for scrolling a screen on which one or more messages 221, 222, 223, 224, 231, 232, 233, and 234 are displayed at a reference speed or more as a user input for displaying one or more of previous conversation information and recommendation information. As another example, the controller 180 may acquire a user input for scrolling a screen on which one or more messages 221, 222, 223, 224, 231, 232, 233, and 234 are displayed with a reference value or more as a user input for displaying one or more of previous conversation information and recommendation information. In addition, the controller 180 may acquire a user input for scrolling a screen on which one or more messages 221, 222, 223, 224, 231, 232, 233, and 234 are displayed as a user input for displaying one or more of previous conversation information and recommendation information. For example, the controller 180 may acquire a user input for scrolling a screen on which one or more messages 221, 222, 223, 224, 231, 232, 233, and 234 are displayed with the reference value or more at a reference speed or more as a user input for displaying one or more of previous conversation information and recommendation information. Here, the user input for scrolling the screen with the reference value or more may include a scroll input out of a certain range from a currently displayed message. In addition, the reference speed and the reference value with respect to the scrolling may be variously set according to selections of a user or a designer. The messages 221, 222, 223, and 224 may be messages received by the user, and the messages 231, 232, 233, and 234 may be messages transmitted by the user.

Again, FIG. 2 will be described.

The controller 180 of the terminal 100 displays one or more of the acquired previous conversation information and recommendation information (S111).

The controller 180 may output one or more of the acquired previous conversation information and recommendation information through the output unit 150. In an embodiment, the controller 180 may display one or more of the acquired previous conversation information and recommendation information through the display unit 151. In another embodiment, the controller 180 may output one or more of the acquired previous conversation information and recommendation information through the audio output module 152.

This will be described with reference to FIGS. 7 and 8.

Figure 7:
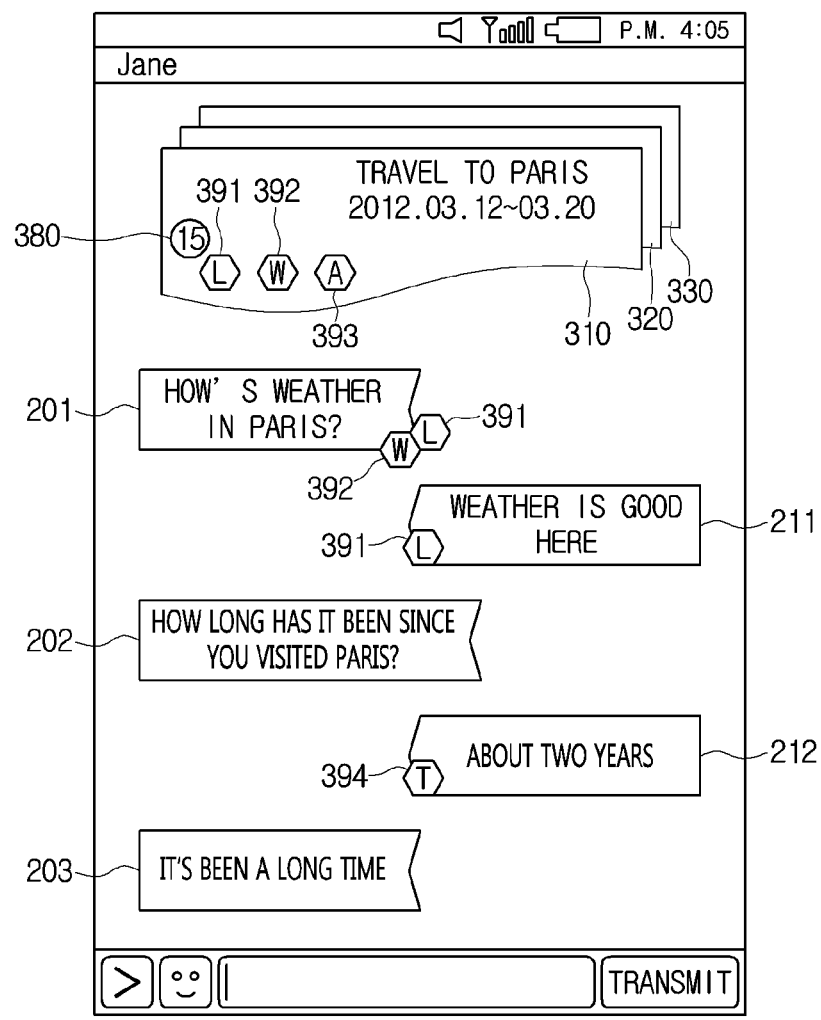
FIG. 7 is an exemplary view illustrating display of a plurality of previous conversation information and recommendation information windows.

FIG. 7 is an exemplary view illustrating display of a plurality of previous conversation information and recommendation information windows.

Referring to FIG. 7, the controller 180 may display one or more messages 201, 202, 203, 211, and 212 on a screen of the display unit 151, and display one or more previous conversation information and recommendation information windows 310, 320, and 330 corresponding to the displayed one or more messages 201, 202, 203, 211, and 212. Here, previous conversation information and recommendation information, which are included in the displayed one or more previous conversation information and recommendation information windows may be one or more of previous conversation information and recommendation information, which are acquired based on the displayed one or more messages 201, 202, 203, 211, and 212.

The controller 180 may display a message number icon 380 representing a number of messages included in each of the displayed one or more previous conversation information and recommendation information windows. In addition, the controller 180 may display one or more category icons 391, 392, and 393 representing categories related to each of the displayed one or more previous conversation information and recommendation information windows.

The category icons will be described in detail with reference to FIG. 8.

Figure 8:
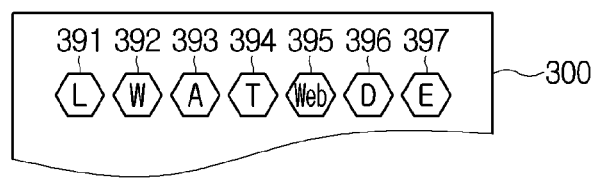
FIG. 8 is an exemplary view illustrating category icons according to an embodiment of the present invention.

FIG. 8 is an exemplary view illustrating category icons according to an embodiment of the present invention.

Referring to FIG. 8, the controller 180 may display one or more category icons 391, 392, 393, 394, 395, 396, and 397 on a previous conversation information and recommendation information window 300.

Here, an L category icon 391 may be an icon representing Location among a plurality of categories. Therefore, the L category icon 391 may be an icon related to the location of the terminal 100. A W category icon 392 may be an icon representing Word among the plurality of categories. Therefore, the W category icon 392 may be an icon related to a keyword of a message. An A category icon 393 may be an icon representing Application among the plurality of categories. Therefore, the A category icon 393 may be an icon related to an application executed in the terminal 100. A T category icon 394 may be an icon representing Time among the plurality of categories. Therefore, the T category icon 394 may be an icon related to a message transmission/reception time and a message checking time. A Web category icon 395 may be an icon representing Web page among the plurality of categories. Therefore, the Web category icon 395 may be an icon related to an opened web page in the terminal 100. A D category may be an icon related to Device among the plurality of categories. Therefore, the D category icon 396 related to a device linked with the terminal 100. An E category icon 397 may be an icon representing Emotion of the user of the terminal 100. Therefore, the E category icon 397 may be an icon related to an emotion of the user, which is detected while a message is being displayed.

The above-described category icons are merely examples for description. However, the present invention is not limited thereto, and the category icons may be variously set according to selections of a user or a designer.

Referring back to FIG. 7, the controller 180 may display one or more category icons in a message corresponding to the above-described one or more category icons among the displayed one or more messages 201, 202, 203, 211, and 212. Therefore, the controller 180 may display, in the displayed message 201, the L category icon 391 and the W category icon 392, which correspond to the message 201. The controller 180 may display, in the displayed message 211, the L category icon 391 corresponding to the message 211. The controller 180 may display, in the displayed message 212, the T category icon 394 corresponding to the message 212.

Meanwhile, if a user input for selecting the displayed category icon is acquired, the controller 180 may display a list of one or more previous conversation information and recommendation information windows corresponding to the selected category icon. In addition, the controller 180 may display the list of the one or more previous conversation information and recommendation information windows corresponding to the selected category icon on the entire screen or a partial screen of the display unit 150.

This will be described with reference to FIGS. 9A and 9B.

Figure 9A:
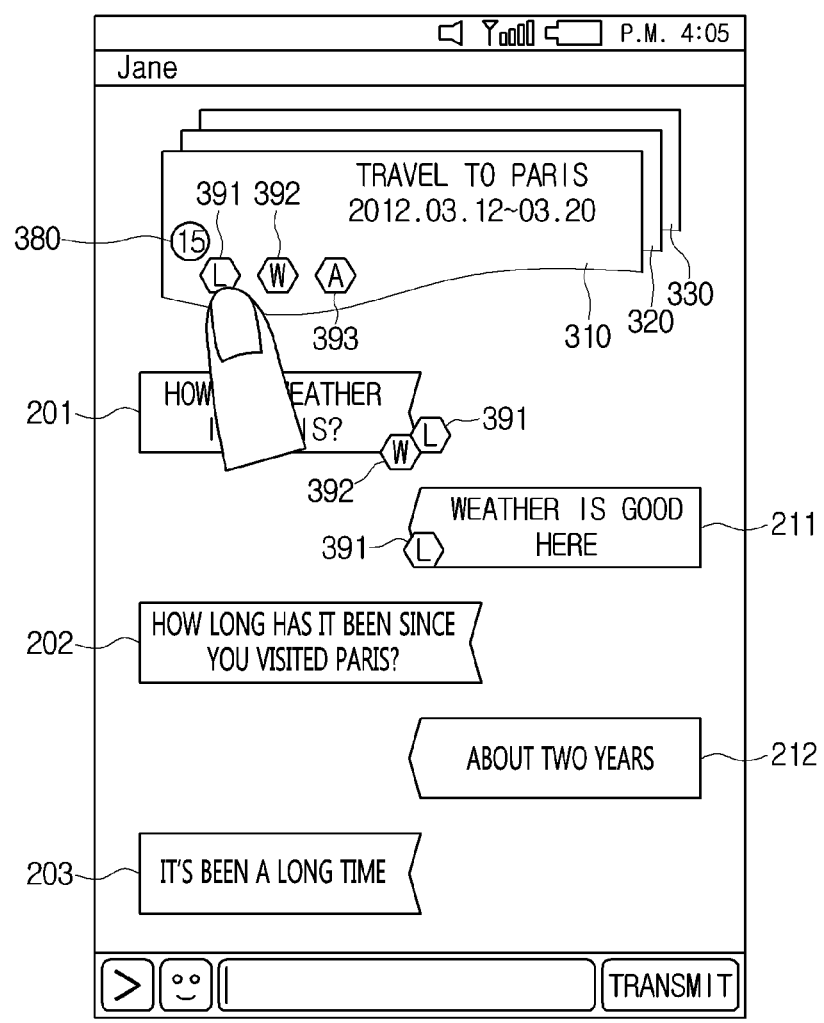
FIG. 9A is an exemplary view illustrating a user input for selecting a category icon according to an embodiment of the present invention.

FIG. 9A is an exemplary view illustrating a user input for selecting a category icon according to an embodiment of the present invention.

Figure 9B:
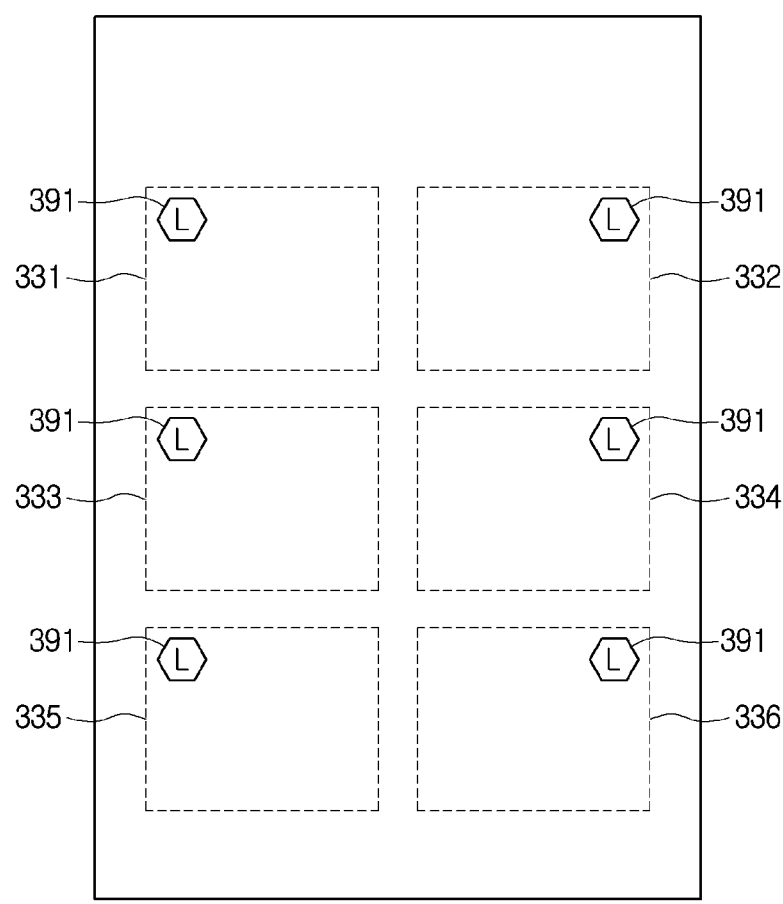
FIG. 9B is an exemplary view illustrating display of a list of previous conversation window and recommendation information windows corresponding to the selected category icon according to an embodiment of the present invention.

FIG. 9B is an exemplary view illustrating display of a list of previous conversation window and recommendation information windows corresponding to the selected category icon according to an embodiment of the present invention.

In an embodiment, referring to FIG. 9A, the controller 180 may acquire a user input for touching the L category icon 391 among the plurality of category icons 391, 329, and 393 displayed on the previous conversation information window 310 as a user input for selecting a category icon. Therefore, the controller 180 may display a list of one or more previous conversation information and recommendation information windows corresponding to the selected L category icon 391 on the entire screen or a partial screen of the display unit 151. In an embodiment, referring to FIG. 9B, the controller 180 may display a list of previous conversation information and recommendation information windows 331, 332, 333, 334, 335, and 336 corresponding to the selected L category icon 391 on the entire screen of the display unit 151. In addition, the controller 180 may display all or some contents of one or more of previous conversation information and recommendation information in each of the displayed previous conversation information and recommendation information windows 331, 332, 333, 334, 335, and 336.

Meanwhile, the controller 180 may display a layer of messages displayed on the same screen of the display unit 151 and a layer of one or more of acquired previous conversation information and recommendation information.

This will be described with reference to FIGS. 10 and 11.

Figure 10:
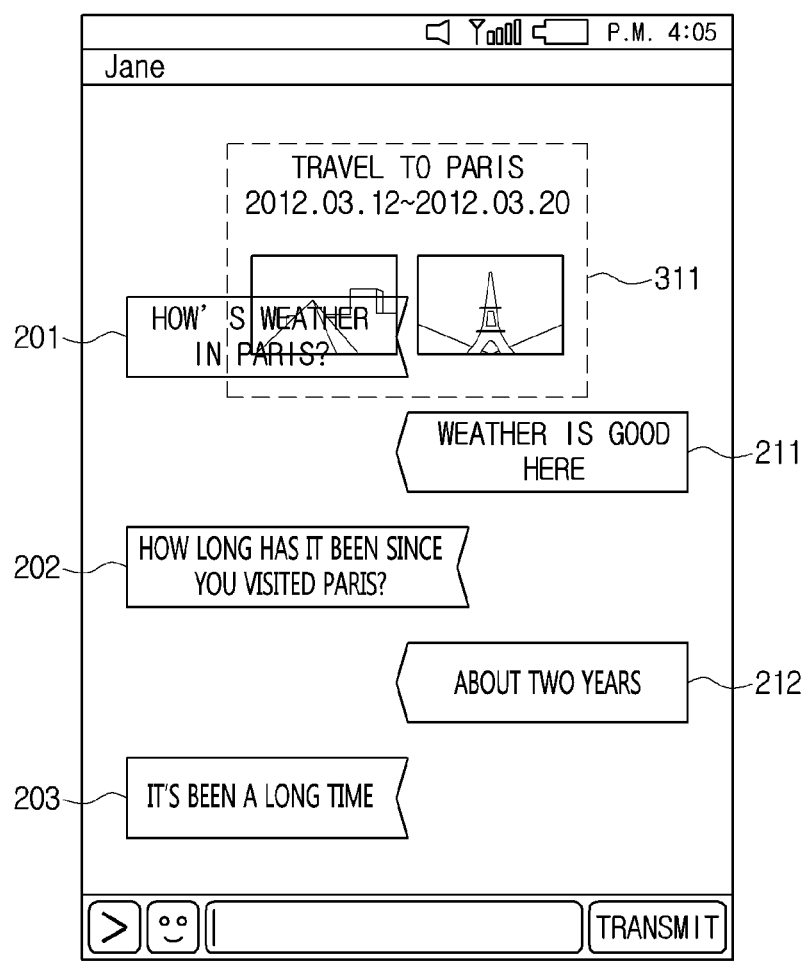
FIG. 10 is an exemplary view illustrating a plurality of layer screens according to an embodiment of the present invention.

FIG. 10 is an exemplary view illustrating a plurality of layer screens according to an embodiment of the present invention.

Figure 11:
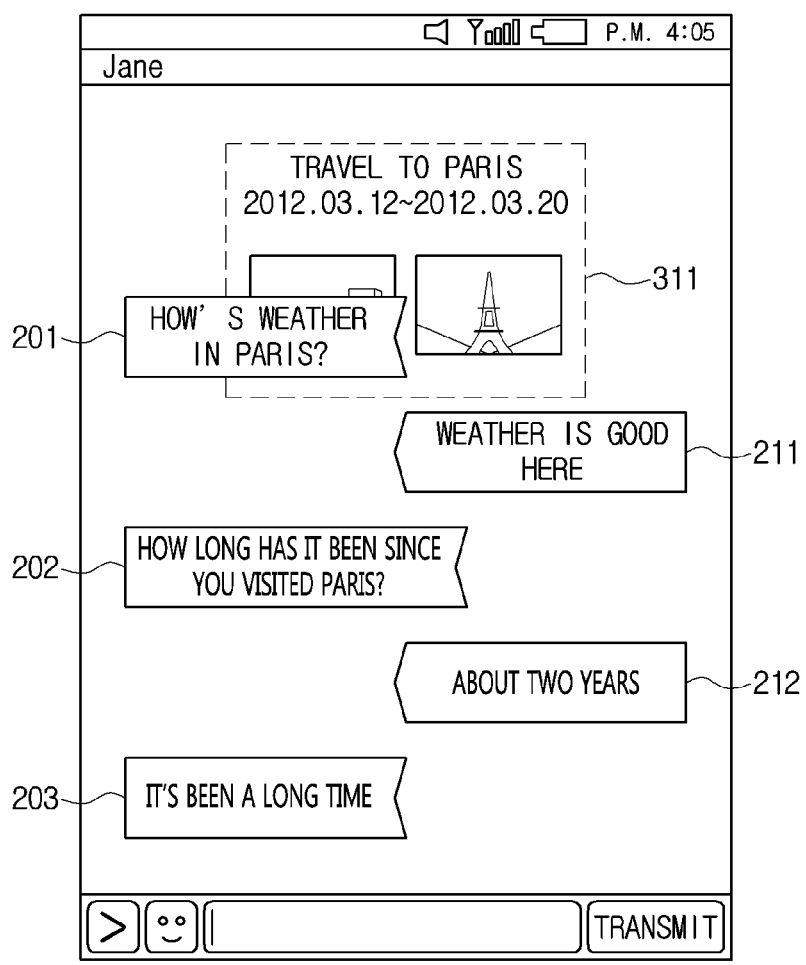
FIG. 11 is an exemplary view illustrating a plurality of layer screens according to another embodiment of the present invention.

FIG. 11 is an exemplary view illustrating a plurality of layer screens according to another embodiment of the present invention.

In an embodiment, referring to FIG. 10, the controller 180 may display one or more messages 201, 202, 203, 211, and 212 in a first layer of the same screen of the display unit 151, and display a window 311 on one of the acquired previous conversation information and the acquire recommendation information in a second layer. In addition, the controller 180 may transparently display one or more messages 201, 202, 203, 211, and 212 included in the first layer. Therefore, the controller 180 may display, on the previous conversation information window 311, keywords about a previous conversation with another user that has transmitted messages 201, 202, and 203, a conversation time, and related images.

In another embodiment, as shown in FIG. 11, the controller 180 may opaquely display the messages 201, 202, 203, 211, and 212 included in the first layer, and display the window 311 on one of the acquired previous conversation information and recommendation information in the second layer.

In still another embodiment, the controller 180 may transparently display only messages 201 and 211 overlapping with the window 311 included in the second layer among the messages 201, 202, 203, 211, and 212 included in the first layer.

In addition, the controller 180 may change one or more of a position of the first layer, a position of the second layer, and a layer order depending on an acquired user input. This will be described later.

Meanwhile, the controller 180 may display, in the second layer, a window on one of a plurality of previous conversation information and recommendation information.

This will be described with reference to FIG. 12.

Figure 12:
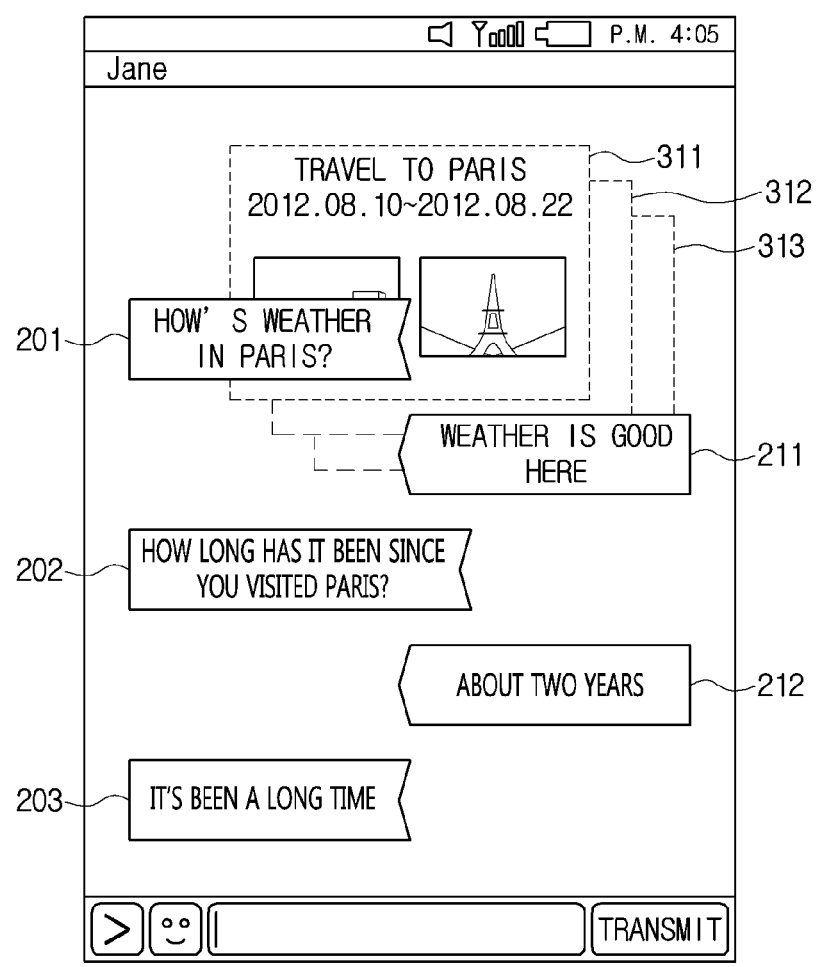
FIG. 12 is an exemplary view illustrating a plurality of layer screens according to still another embodiment of the present invention.

FIG. 12 is an exemplary view illustrating a plurality of layer screens according to still another embodiment of the present invention.

Referring to FIG. 12, the controller 180 may display one or more messages 201, 202, 203, 211, and 212 in a first layer of the same screen of the display unit 151, and display windows 311, 312, and 313 on one or more of a plurality of acquired previous conversation information and recommendation information in a second layer. Here, the windows 311, 312, and 313 on one or more of the plurality of acquired previous conversation information and recommendation information may include different previous conversation information and recommendation information.

In addition, if a user input for changing the window on one or more of the plurality of acquired previous conversation information and recommendation information is acquired, the controller 180 may change one or more of a position of the window on one or more of the plurality of acquired previous conversation information and recommendation information and a layer order.

This will be described with reference to FIGS. 13A and 13B.

Figure 13A:
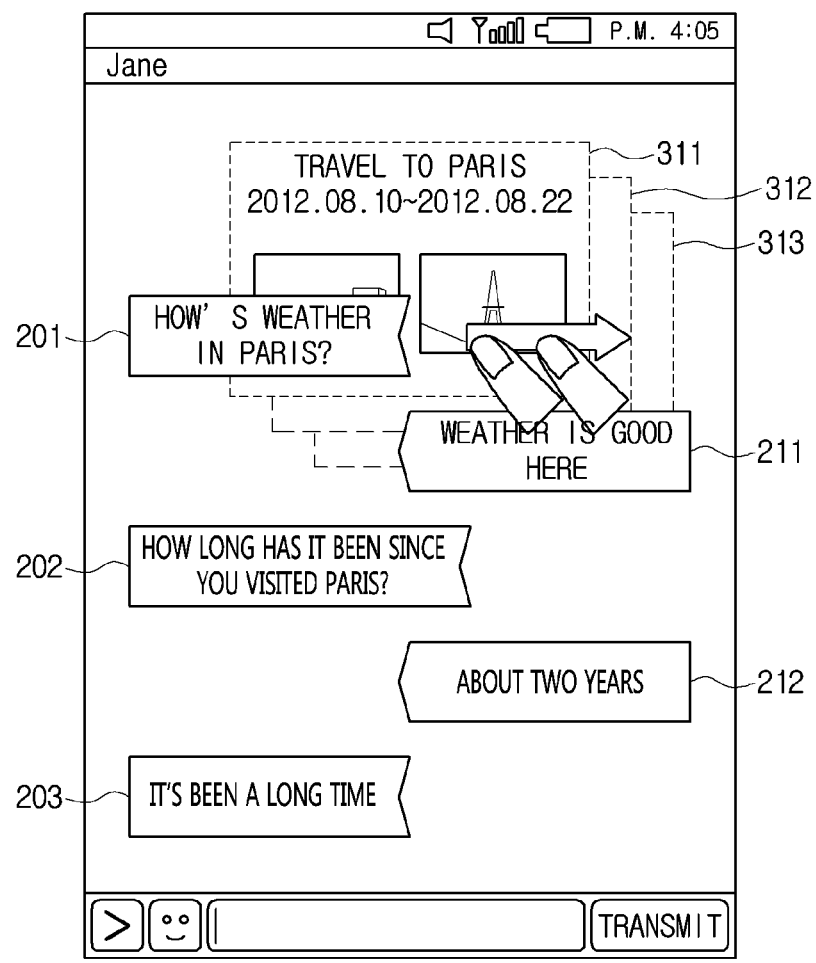
FIG. 13A is an exemplary view illustrating a user input for changing a layer order according to an embodiment of the present invention.

FIG. 13A is an exemplary view illustrating a user input for changing a layer order according to an embodiment of the present invention.

Figure 13B:
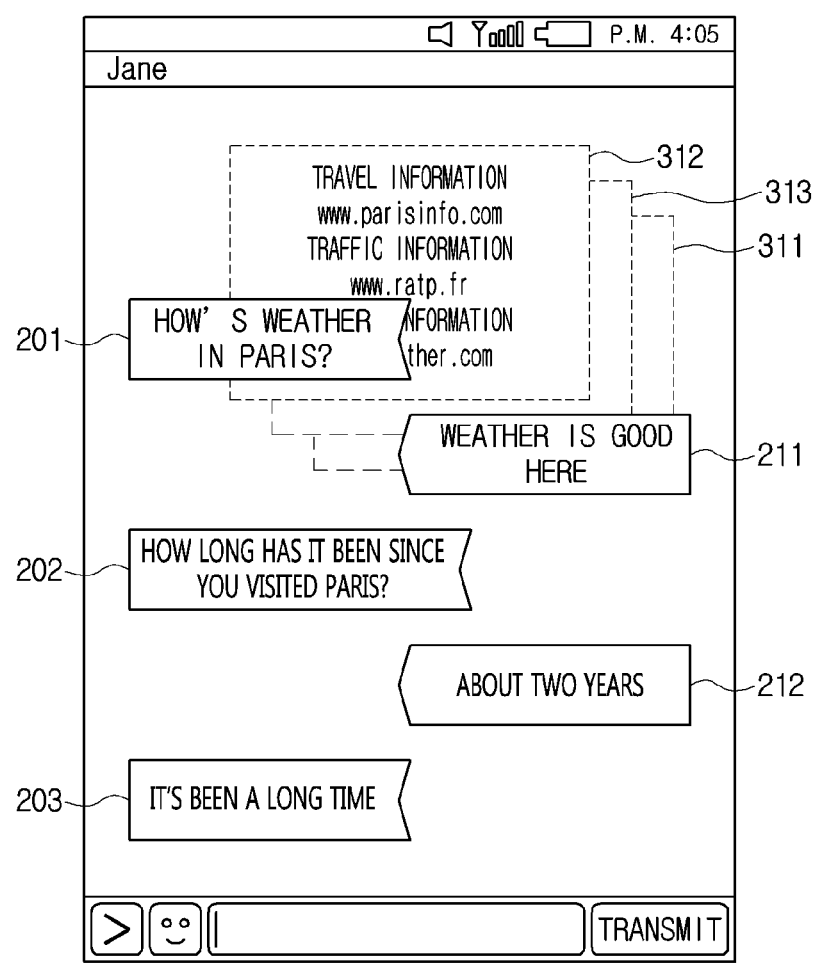
FIG. 13B is an exemplary view illustrating a screen on which the layer order is changed according to an embodiment of the present invention.

FIG. 13B is an exemplary view illustrating a screen on which the layer order is changed according to an embodiment of the present invention.

In an embodiment, referring to FIG. 13A, the controller 180 may acquire a user input for swiping a window 311 on previous conversation information displayed in a second layer in one direction, on a screen on which one or more messages 201, 202, 203, 211, and 212 are displayed in a first layer, and windows 311, 312, and 313 on one of a plurality of acquired previous conversation information and recommendation information are displayed in the second layer. Therefore, as shown in FIG. 13B, the controller 180 may change the screen on which the window 113 on the previous conversation information is located at the uppermost position in the second layer to a screen on which a window 312 on recommendation information is displayed at the uppermost position, and the window 311 on the previous conversation information is displayed at the lowermost position. Therefore, the controller 180 may the recommendation information window 312 to include a web page link on travel related information. Here, the user input for changing the layer order may be a user input for a multi-touch.

In addition, if one or more of previous conversation information and recommendation information corresponding to one of the previous conversation information and recommendation information displayed on the display unit 151 are stored or if a user input for sharing one or more of previous conversation information and recommendation information with another user is acquired, the controller 180 may store one or more of previous conversation information and recommendation information or share one or more of previous conversation information and recommendation information with another user.

This will be described with reference to FIG. 14.

Figure 14:
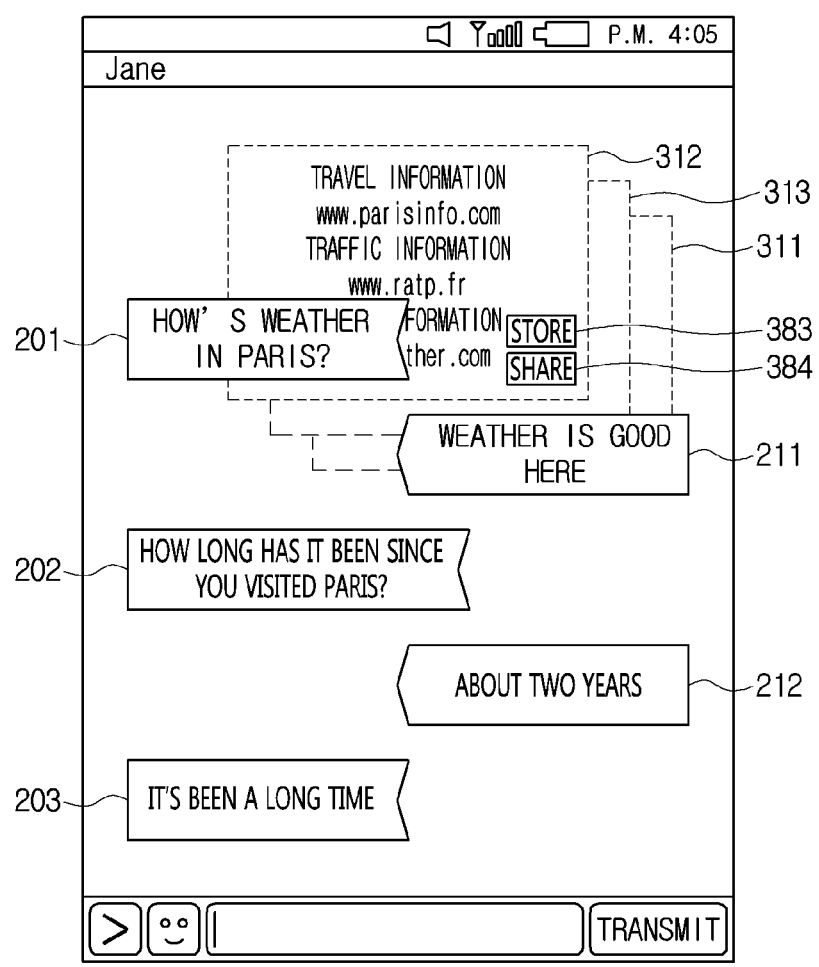
FIG. 14 is an exemplary embodiment of a screen for storing and sharing information according to an embodiment of the present invention.

FIG. 14 is an exemplary embodiment of a screen for storing and sharing information according to an embodiment of the present invention.

In an embodiment, referring to FIG. 14, the controller 180 may acquire a user input for touching a storage button 393 for storing recommendation information corresponding to a window 312 on recommendation information displayed in a second layer and a sharing button 384 for sharing the recommendation information, on a screen on which one or more messages 201, 202, 203, 211, and 212 are displayed in a first layer, and windows 311, 312, and 313 on one of a plurality of acquired previous conversation information and recommendation information are displayed in the second layer. Therefore, the controller 180 may store recommendation information corresponding to the window on the selected recommendation information, or may share recommendation information corresponding to the window on the selected recommendation information with another user.

Meanwhile, the controller 180 may display one or more messages on a screen of the display unit 151, and display a window on one or more of previous conversation information and recommendation information at a background of the screen on the one or more messages are displayed.

This will be described with reference to FIGS. 15 and 16.

Figure 15:
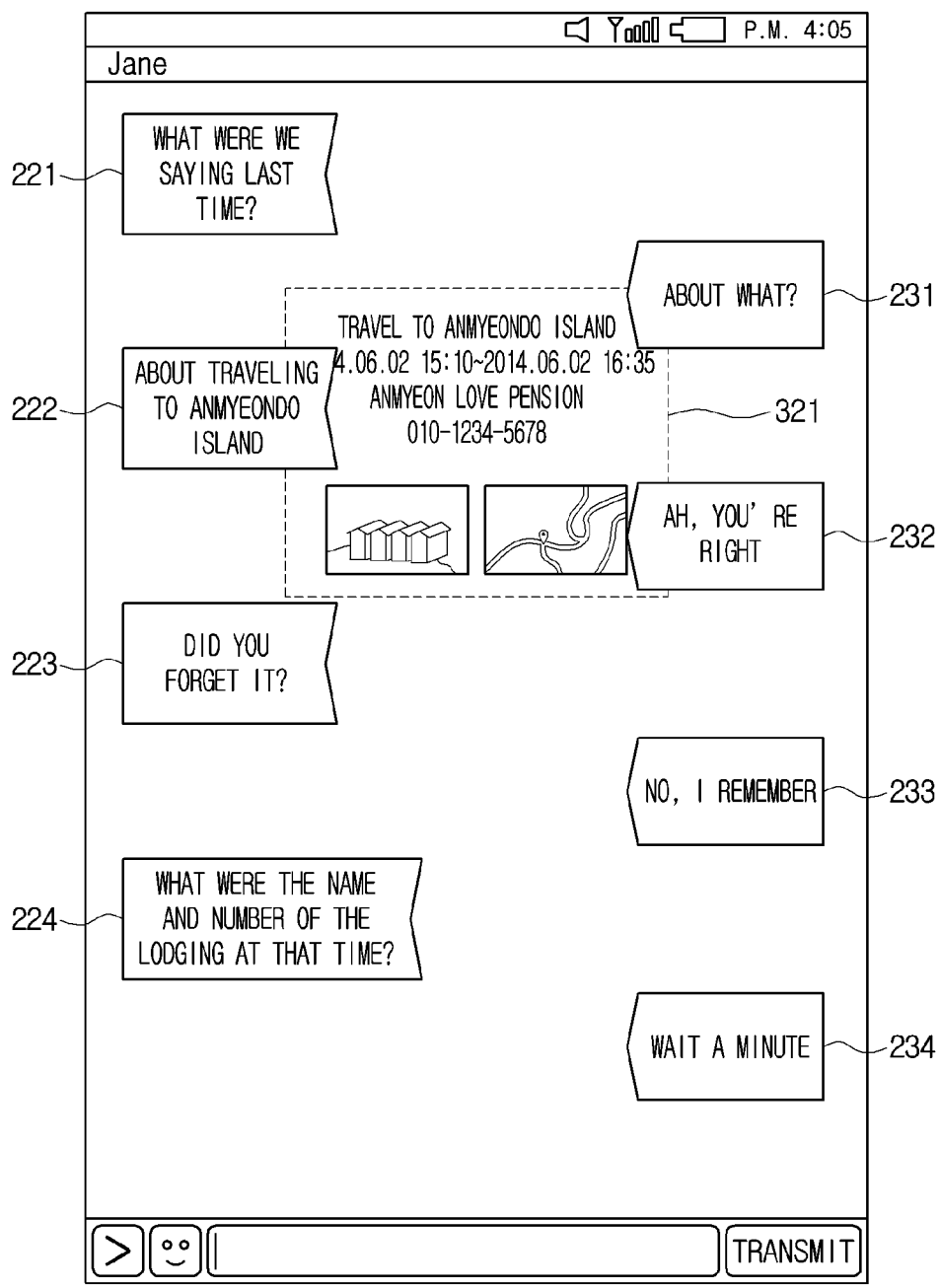
FIG. 15 is an exemplary view illustrating display of a previous conversation information window according to an embodiment of the present invention.

FIG. 15 is an exemplary view illustrating display of a previous conversation information window according to an embodiment of the present invention.

Figure 16:
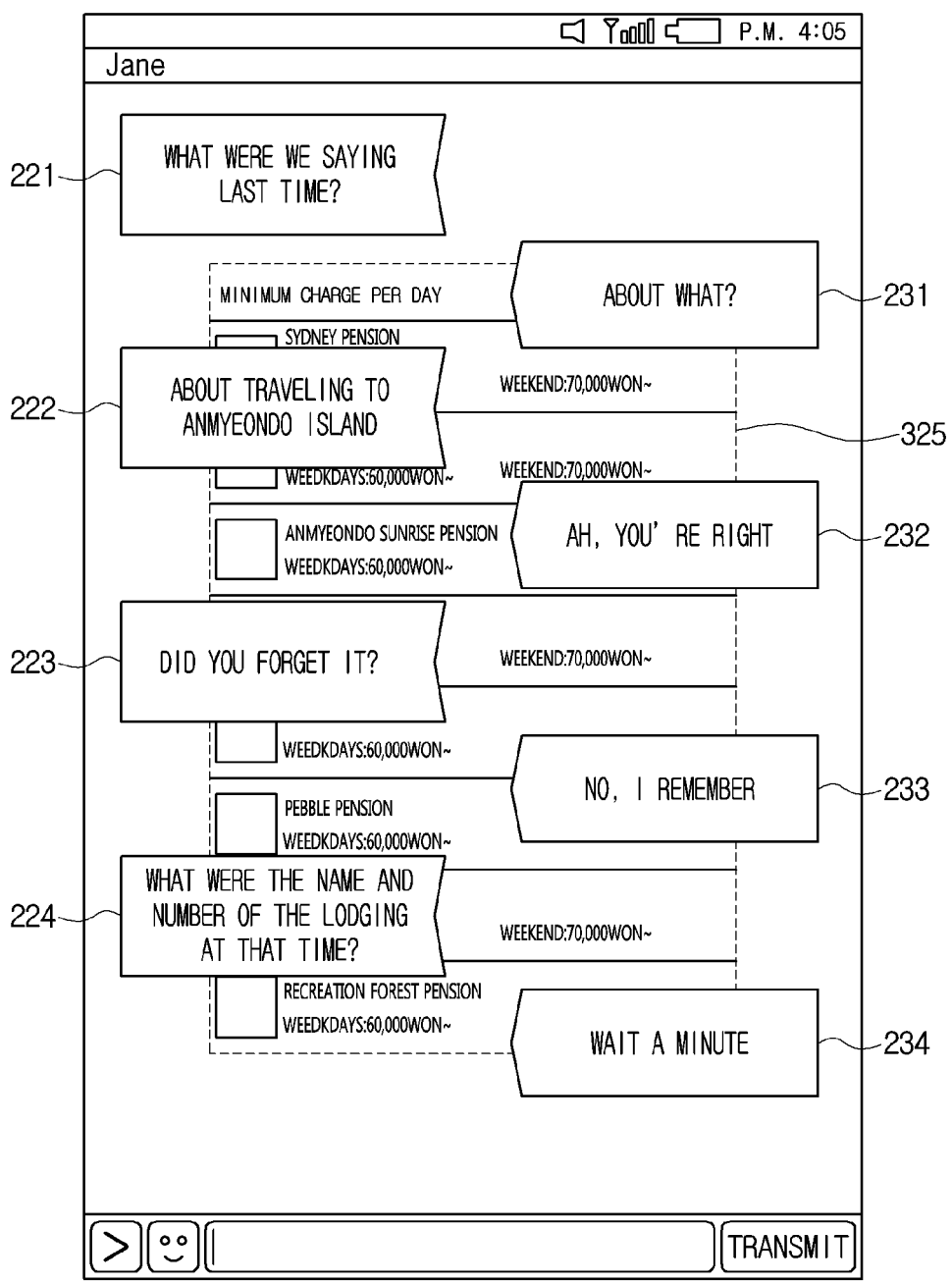
FIG. 16 is an exemplary view illustrating display of a recommendation information window according to an embodiment of the present invention.

FIG. 16 is an exemplary view illustrating display of a recommendation information window according to an embodiment of the present invention.

Referring to FIG. 15, the controller 180 may display, at a screen background, a previous conversation information window 321 corresponding to one or more messages 221, 222, 223, 224, 231, 232, 233, and 234 displayed on a screen of the display unit 151. In addition, the controller 180 may display the previous conversation information window 321 to include a keyword on previous conversation information, a conversation time, main contents, and main images.

Referring to FIG. 16, the controller 180 may display, at a screen background, a recommendation information window 325 corresponding to one or more messages 221, 222, 223, 224, 231, 232, 233, and 234 displayed on a screen of the display unit 151. In addition, the controller 180 may display the recommendation information window 325 to include travel information and lodging information, which are information related to the displayed one or more messages 221, 222, 223, 224, 231, 232, 233, and 234.

Meanwhile, when one or more of previous conversation information and recommendation information corresponding to one or more messages displayed on a screen are displayed, the controller 180 may display a message corresponding to the displayed previous conversation information and recommendation information in the same color as the displayed previous conversation information window and recommendation information window. For example, the controller 180 may display the recommendation information window in blue, and display a message corresponding to the recommendation information window in blue. The controller 180 may display the previous conversation information window in red, and display a message corresponding to the previous conversation information window in red.

In addition, the controller 180 may display the previous conversation information window and the recommendation information window to have different colors and different shapes. For example, the controller 180 may display the previous conversation window in red, and display the recommendation information window in blue.

The above-described previous conversation window and recommendation information window are merely examples for description. However, the present invention is not limited thereto, and the previous conversation window and recommendation information window may be variously set according to selections of a user or a designer.

Again, FIG. 2 will be described.

If a user input for displaying detail information on one or more of the displayed previous conversation information and recommendation information is acquired (S113), the controller 180 of the terminal 100 display detail information on one or more of the previous conversation information and recommendation information (S115).

If a user input for displaying detail information on one or more of previous conversation information and recommendation information is acquired on a screen of the display unit 151, on which one or more messages and one or more of the previous conversation information and recommendation information are displayed, the controller 180 may display detail information on one or more of the previous conversation information and recommendation information on one of the entire screen, a portion of the entire screen, and another screen. Here, the another screen may mean a screen different from the previous screen by being changed from the displayed screen. In addition, the controller 180 may display detail information on one or more of previous conversation information and recommendation information in a plurality of layers on the same screen as described above.

This will be described with reference to FIGS. 17 to 24.

Figure 17:
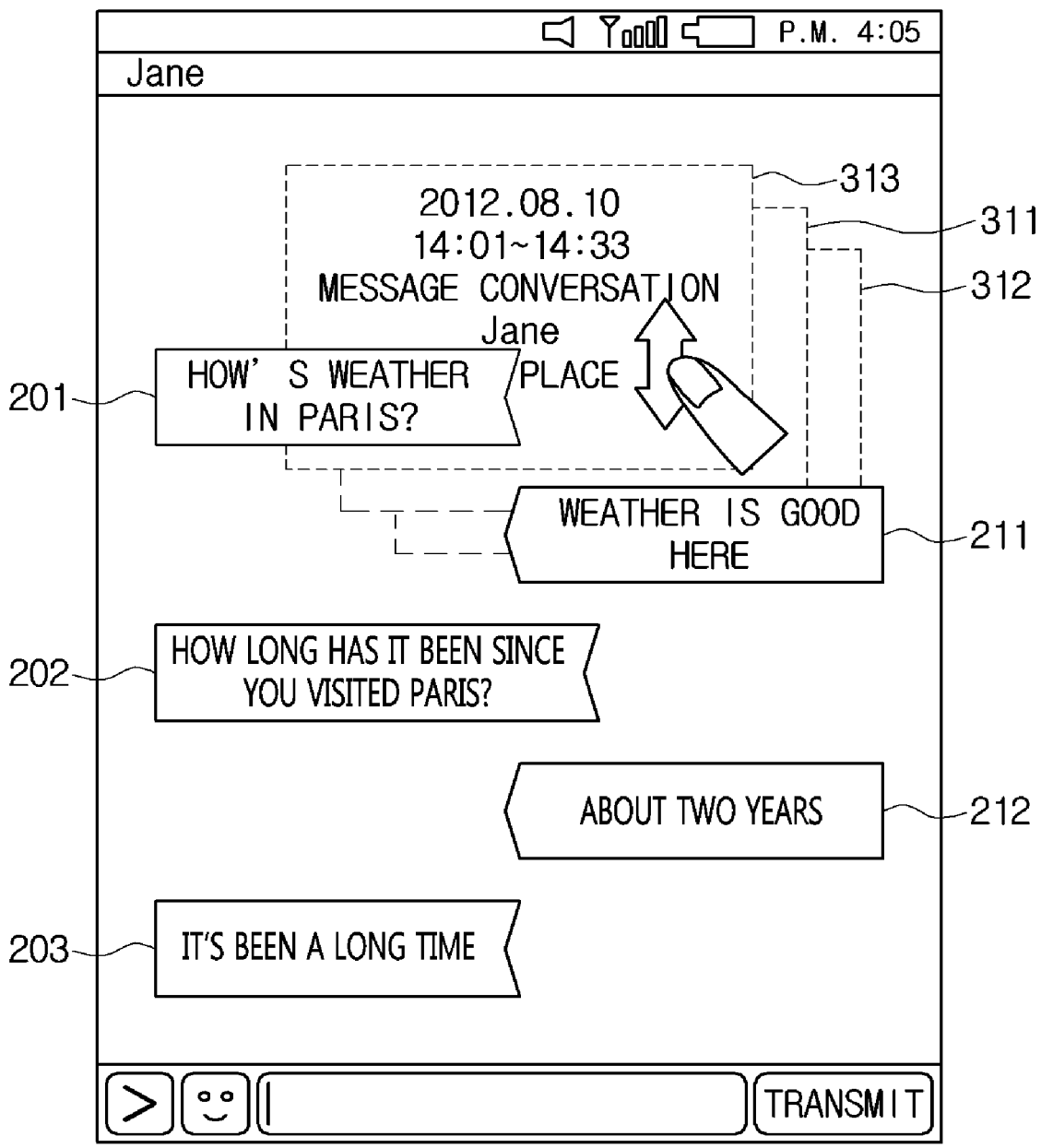
FIG. 17 is an exemplary view illustrating a user input for displaying detail information according to an embodiment of the present invention.

FIG. 17 is an exemplary view illustrating a user input for displaying detail information according to an embodiment of the present invention.

Figure 18:
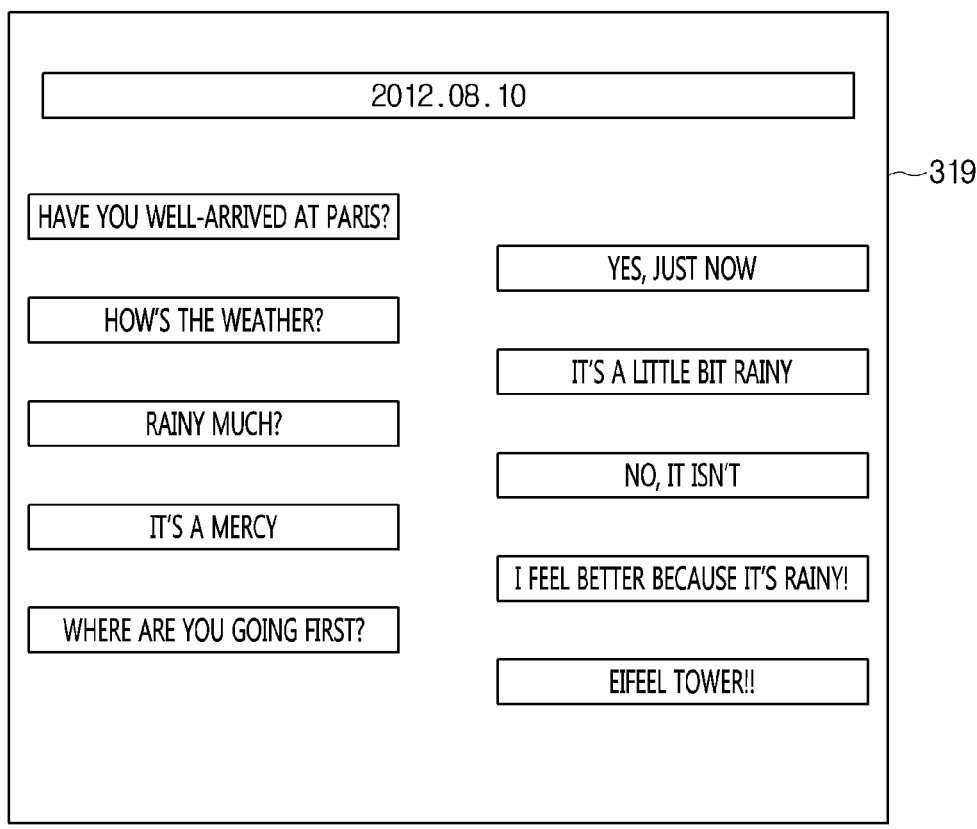
FIG. 18 is an exemplary view illustrating display of detail information according to an embodiment of the present invention.

FIG. 18 is an exemplary view illustrating display of detail information according to an embodiment of the present invention.

In an embodiment, referring to FIG. 17, the controller 180 may display a previous conversation information window 313 corresponding to messages 201, 202, 203, 211, and 212 displayed on a screen of the display unit 151. The controller 180 may display the previous conversation information window 313 to include information on a previous conversation time, a conversation kind, a conversation companion, and a position of the terminal 100. The controller 180 may acquire a touch input for double-tapping the previous conversation information window 313 as a user input for displaying detail information on the previous conversation information window 313. Therefore, the controller 180 may display, on a screen of the display unit 151, detail information on previous conversation information included in the previous conversation information window 313. For example, as shown in FIG. 18, the controller 180 may display, as the entire screen 319, conversation contents of the previous conversation information included in the previous conversation information window 313. Therefore, the controller 180 may display, on the entire screen 319, a user corresponding to the messages 201, 202, and 203 and previous conversation contents of the user of the terminal 100.

Meanwhile, the controller 180 may display a list of previous conversation information and recommendation information as detail information on one or more of previous conversation information and recommendation information.

Figure 19:
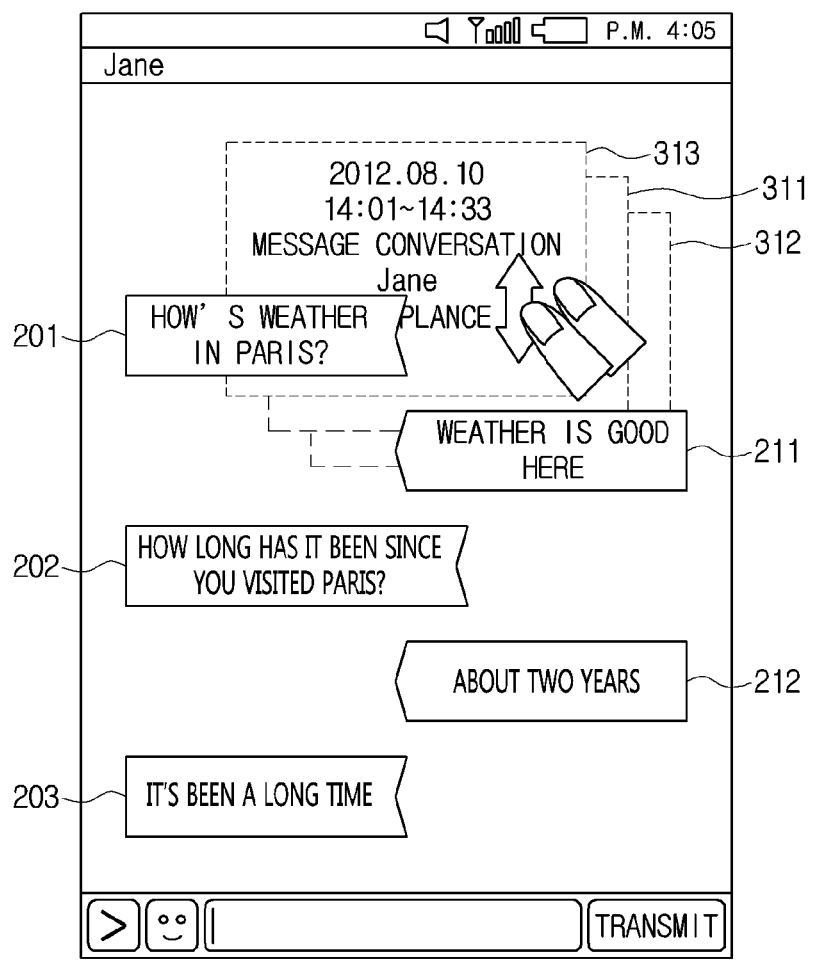
FIG. 19 is an exemplary view illustrating a user input for displaying detail information according to an embodiment of the present invention.

FIG. 19 is an exemplary view illustrating a user input for displaying detail information according to an embodiment of the present invention.

Figure 20:
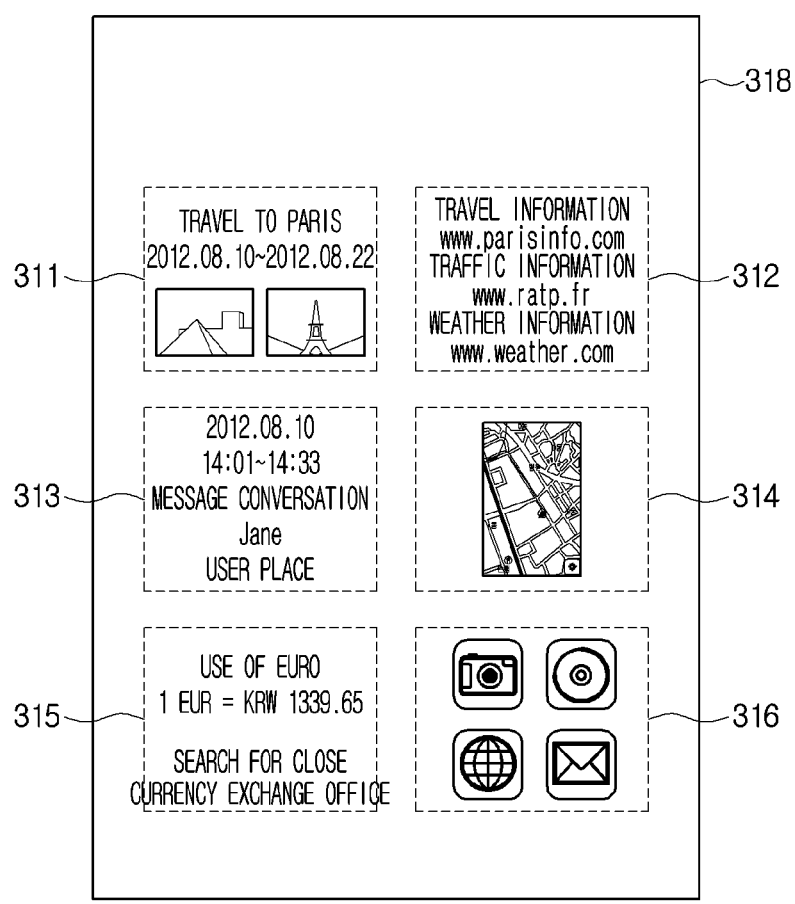
FIG. 20 is an exemplary view illustrating display of a list of previous conversation information and recommendation information according to an embodiment of the present invention.

FIG. 20 is an exemplary view illustrating display of a list of previous conversation information and recommendation information according to an embodiment of the present invention.

In an embodiment, referring to FIG. 19, the controller 180 may display a previous conversation information window 313 corresponding to messages 201, 202, 203, 211, and 212 displayed on a screen of the display unit 151. The controller 180 may display the previous conversation information window 313 to include information on a previous conversation time, a conversation kind, a conversation companion, and a position of the terminal 100. The controller 180 may acquire a touch input for double-tapping the previous conversation information window 313 using a multi-touch as a user input for displaying a list of previous conversation information and recommendation information. Therefore, the controller 180 may display a list of a plurality of previous conversation information and recommendation information corresponding to the displayed messages 201, 202, 203, 211, and 212 on a screen of the display unit 151. For example, as shown in FIG. 20, the controller 180 may display, on the entire screen 318, the list of the plurality of previous conversation information and recommendation information corresponding to the displayed messages 201, 202, 203, 211, and 212. Therefore, the controller 180 may display on the entire screen 318, lists for a travel information window 311, a travel related recommendation web page information window 312, a previous conversation information window 313, a location information window 314, an exchange rate information window 315, and an application use information window 316. Here, the previous conversation information window 313 may be an information window corresponding to the previous conversation information, and the travel information window 311, the location information window 314, and the application use information window 316 may be information corresponding to the terminal use information of the user. In addition, the travel related recommendation web page information window 312 and the exchange rate information window 315 may be information corresponding to the recommendation information.

Meanwhile, the controller 180 may detail information on one or more of previous conversation information and recommendation information together with messages on a screen on which the messages are displayed.

Figure 21:
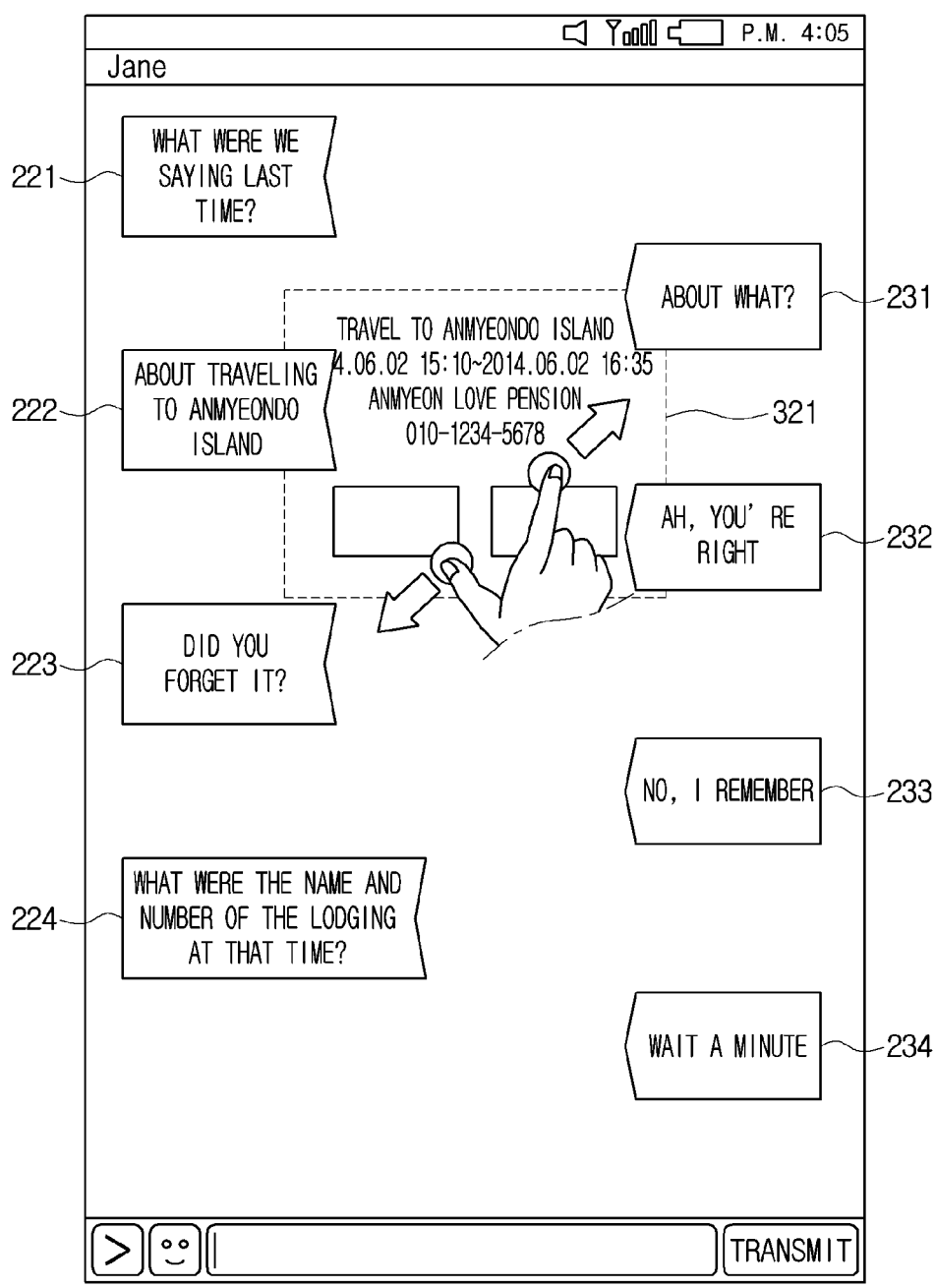
FIG. 21 is an exemplary view illustrating a user input for displaying detail information according to an embodiment of the present invention.

FIG. 21 is an exemplary view illustrating a user input for displaying detail information according to an embodiment of the present invention.

Figure 22:
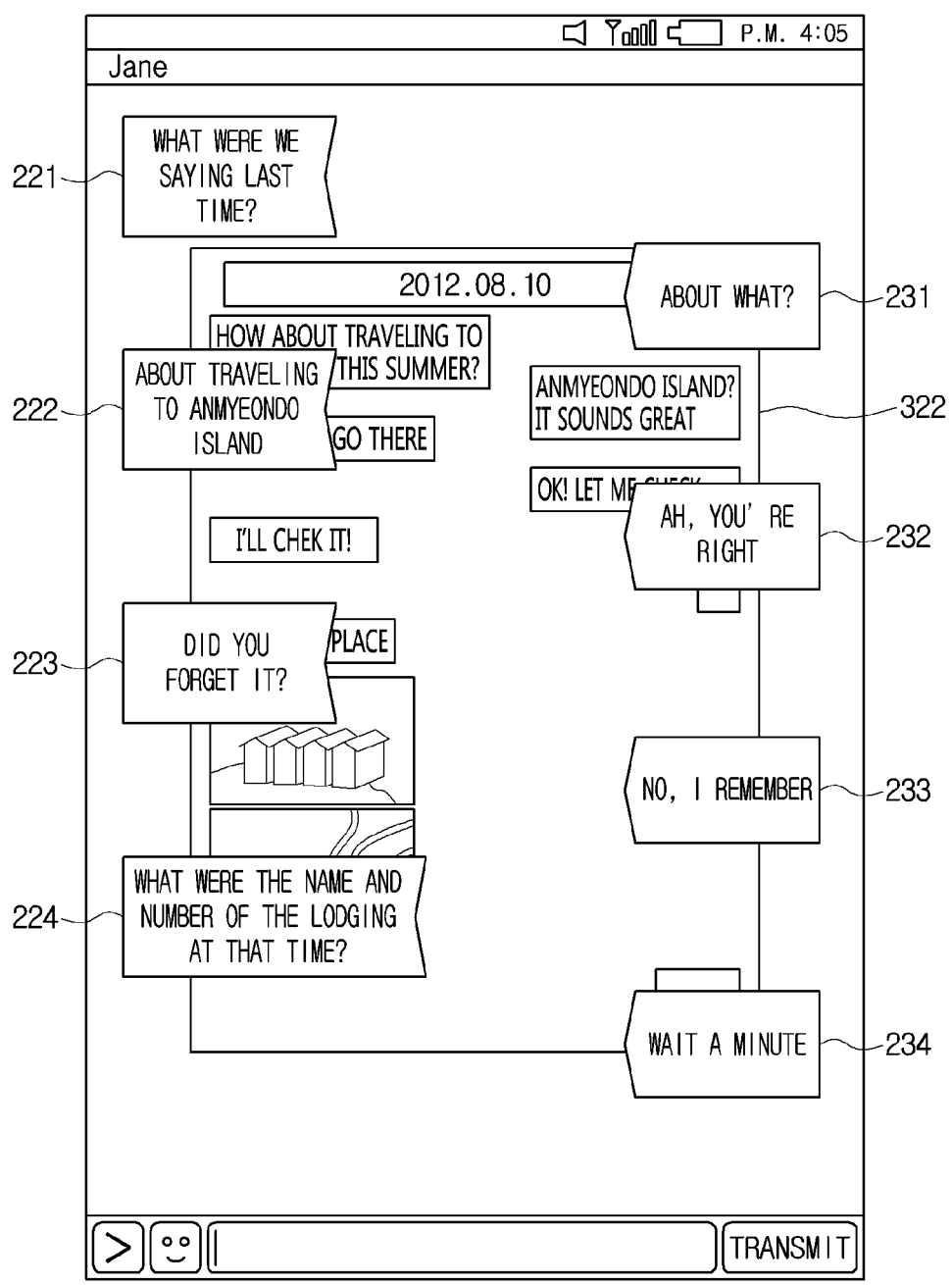
FIG. 22 is an exemplary view illustrating display of detail information according to an embodiment of the present invention.

FIG. 22 is an exemplary view illustrating display of detail information according to an embodiment of the present invention.

In an embodiment, referring to FIG. 21, the controller 180 may display a previous conversation information window 321 corresponding to messages 221, 222, 223, 224, 231, 232, 233, and 234 displayed on a screen of the display unit 151. The controller 180 may display the previous conversation information window 321 to include a previous conversation time, a main keyword, related information, and related images. The controller 180 may acquire a touch input for performing pinch-to-out on the previous conversation information window 321 as a user input for displaying detail information on the previous conversation information window 321. Therefore, the controller 180 may display detail information on previous conversation information included in the previous conversation information window 313 at a background of the entire screen. For example, as shown in FIG. 22, the controller 180 may display conversation contents on the previous conversation information included in the previous conversation information window 321 as a previous conversation content display window 322 at the background of the entire screen. Therefore, the controller 180 may simultaneously display, on the entire screen, ongoing messages 221, 222, 223, 224, 231, 232, 233, and 234 and the previous conversation content display window 322 corresponding to the ongoing messages 221, 222, 223, 224, 231, 232, 233, and 234.

In addition, when a window on a message and a window on one or more of previous conversation information and recommendation information corresponding to the message are simultaneously displayed on the entire screen, if a user input for changing any one of the plurality of windows is acquired, the controller 180 may change one or more of the position, order, and size of the plurality of displayed windows.

This will be described with reference to FIGS. 23 and 24.

Figure 23:
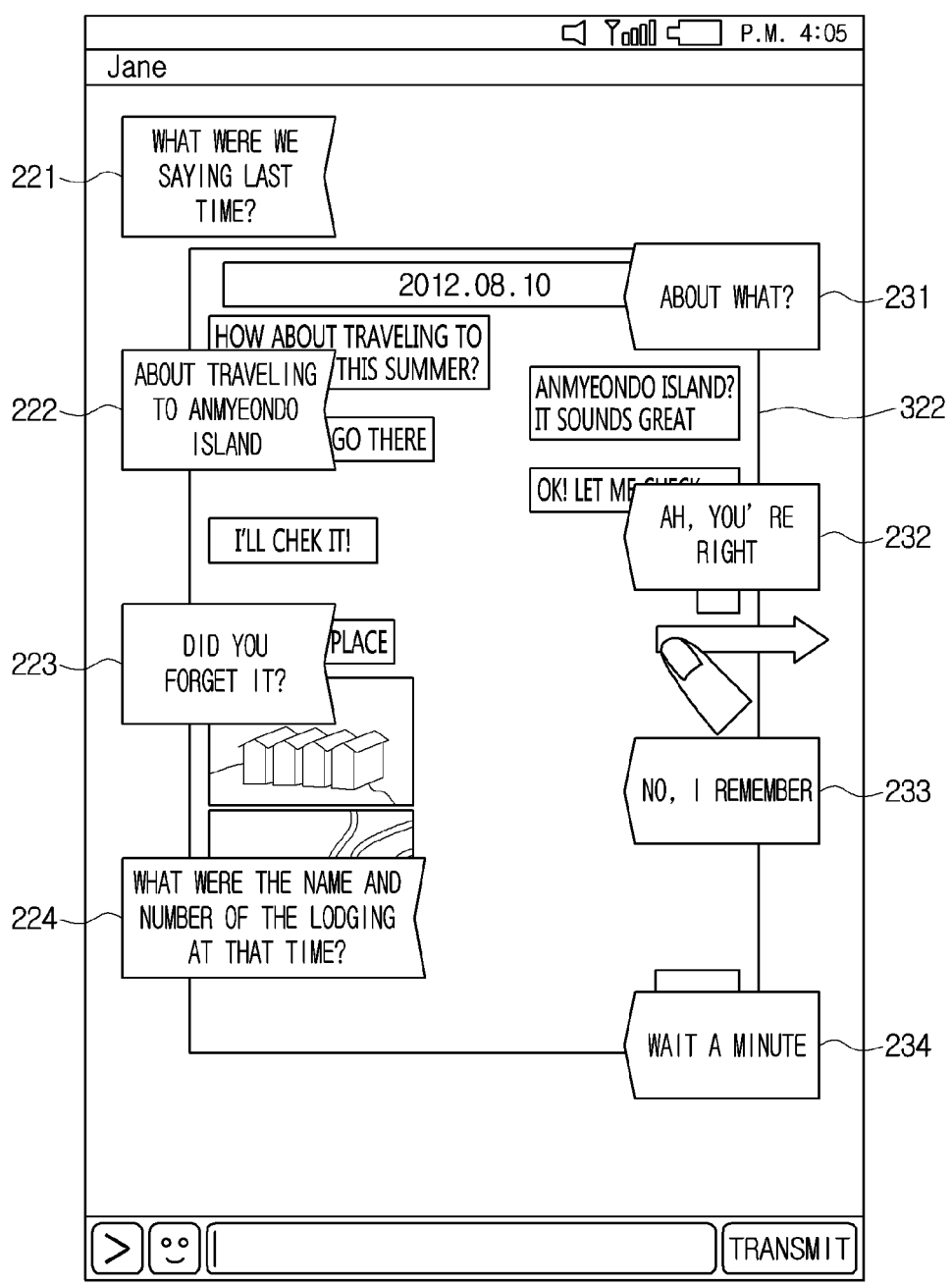
FIG. 23 is an exemplary view illustrating a user input for changing the size of a displayed window according to an embodiment of the present invention.

FIG. 23 is an exemplary view illustrating a user input for changing the size of a displayed window according to an embodiment of the present invention.

Figure 24:
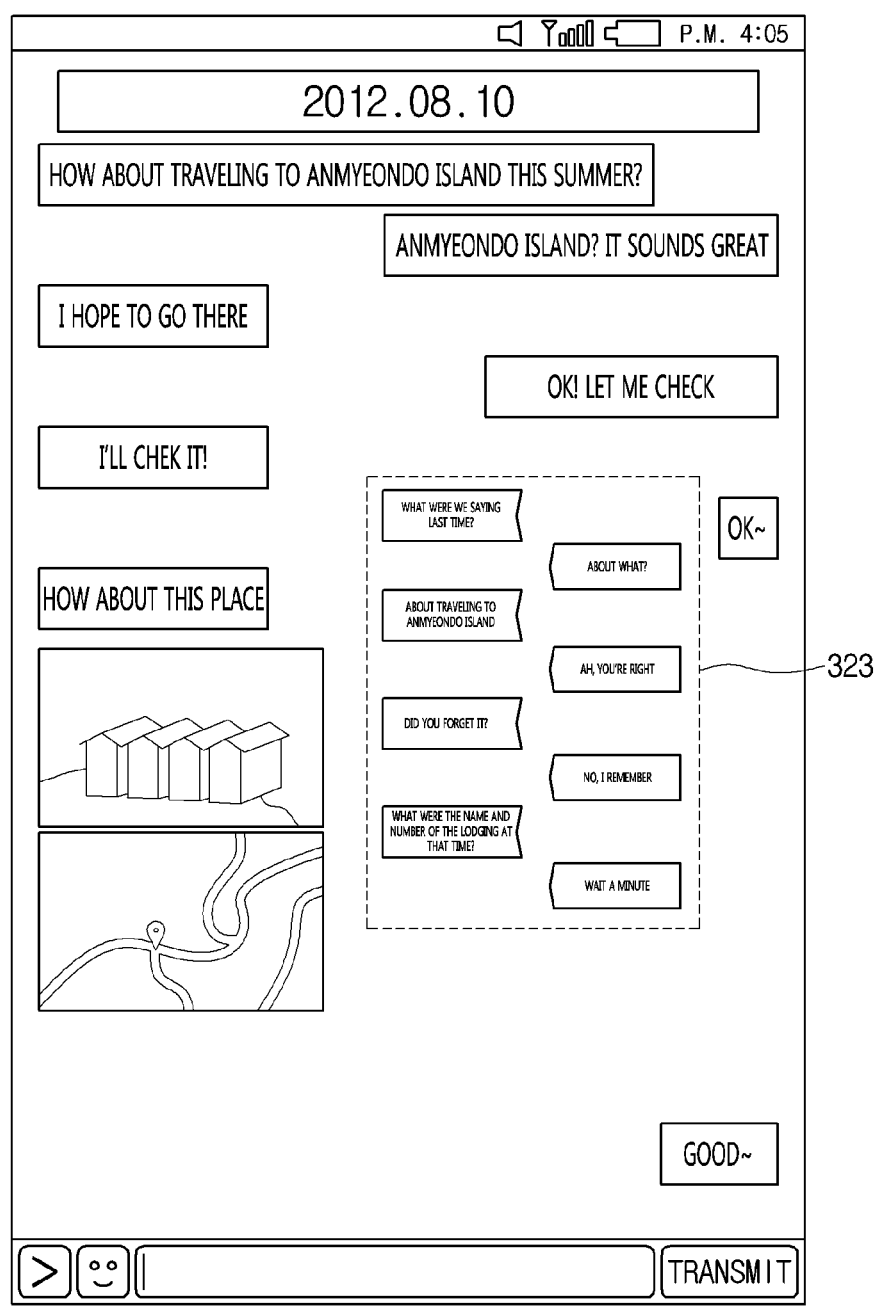
FIG. 24 is an exemplary view illustrating a screen on which sizes of a plurality of windows are changed according to an embodiment of the present invention.

FIG. 24 is an exemplary view illustrating a screen on which sizes of a plurality of windows are changed according to an embodiment of the present invention.

In an embodiment, referring to FIG. 23, the controller 180 may display, on a screen of the display unit 151, one or more messages 221, 222, 223, 224, 231, 232, 233, and 234 in a first size and a previous conversation content display window 322 corresponding to the displayed messages 221, 222, 223, 224, 231, 232, 233, and 234 in a second size. The controller 180 may acquire a touch input for swiping the previous conversation content display window 322 as a user input for changing a size of the window. Therefore, the controller 180 may change the size of the previous conversation content display window 322. For example, as shown in FIG. 24, the controller 180 may display, on one screen, the previous conversation content display window 322 in a first size and a window 323 on one or more messages 221, 222, 223, 224, 231, 232, 233, and 234 in a second size.

The above-described change of the size of the display window is merely an example for description. However, the present invention is not limited thereto, and the change of the size of the display window may be variously set according to selections of a user or a designer.

The terminal according to the present invention may display different display steps of information and message windows displayed based on one or more of a screen scroll speed of the user and a degree where a screen display time elapses. Here, the display steps of the information and message windows may mean sizes of the information and message windows and degrees of displayed contents.

For example, the display steps of the information and message windows may include a plurality of display steps. Each of the plurality of display steps may include information and message windows having different sizes and display contents having different degrees.

This will be described with reference to FIGS. 25 to 29.

Figure 25:
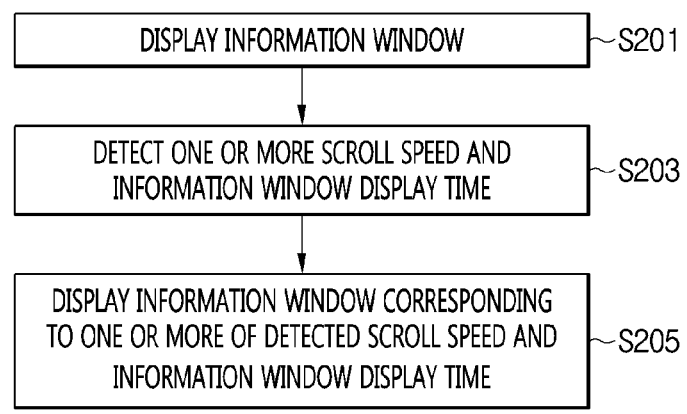
FIG. 25 is a flowchart illustrating display of information window of the terminal according to an embodiment of the present invention.

FIG. 25 is a flowchart illustrating display of an information window of the terminal according to an embodiment of the present invention.

Referring to FIG. 25, the controller 180 of the terminal 100 displays one or more information windows (S201). The controller 180 detects one or more of a scroll speed of the user and a display time of a screen on which the information window is displayed with respect to a screen on which the one or more information windows are displayed (S203), and displays the information window to a display step corresponding to one or more of the detected scroll speed and display time (S205).

FIGS. 26 to 29 are exemplary views illustrating information windows corresponding to display steps according to an embodiment of the present invention.

For example, the terminal 100 of the present invention may display an information window to a plurality of display steps, e.g., first to fourth display steps.

Therefore, the first display step may be a display step corresponding to one or more of a first scroll speed and a first elapsed time. In the first display step, the size of information and message windows may be a first size, and displayed information may include only time information.

The second display step may be a display step corresponding to one or more of a second scroll speed and a second elapsed time. In the second display step, the size of information and message windows may be a second size, and displayed information may include time information and main keyword information.

The third display step may be a display step corresponding to one or more of a third scroll speed and a third elapsed time. In the third display step, the size of information and message windows may be a third size, and displayed information may include time information, main keyword information, summary information, main images, related web page links, and related icons.

The fourth display step may be a display step corresponding to one or more of a fourth scroll speed and a fourth elapsed time. In the fourth display step, the size of information and message windows may be a fourth size, and displayed information may include time information, main keyword information, summary information, main images, and main messages.

Figure 26:
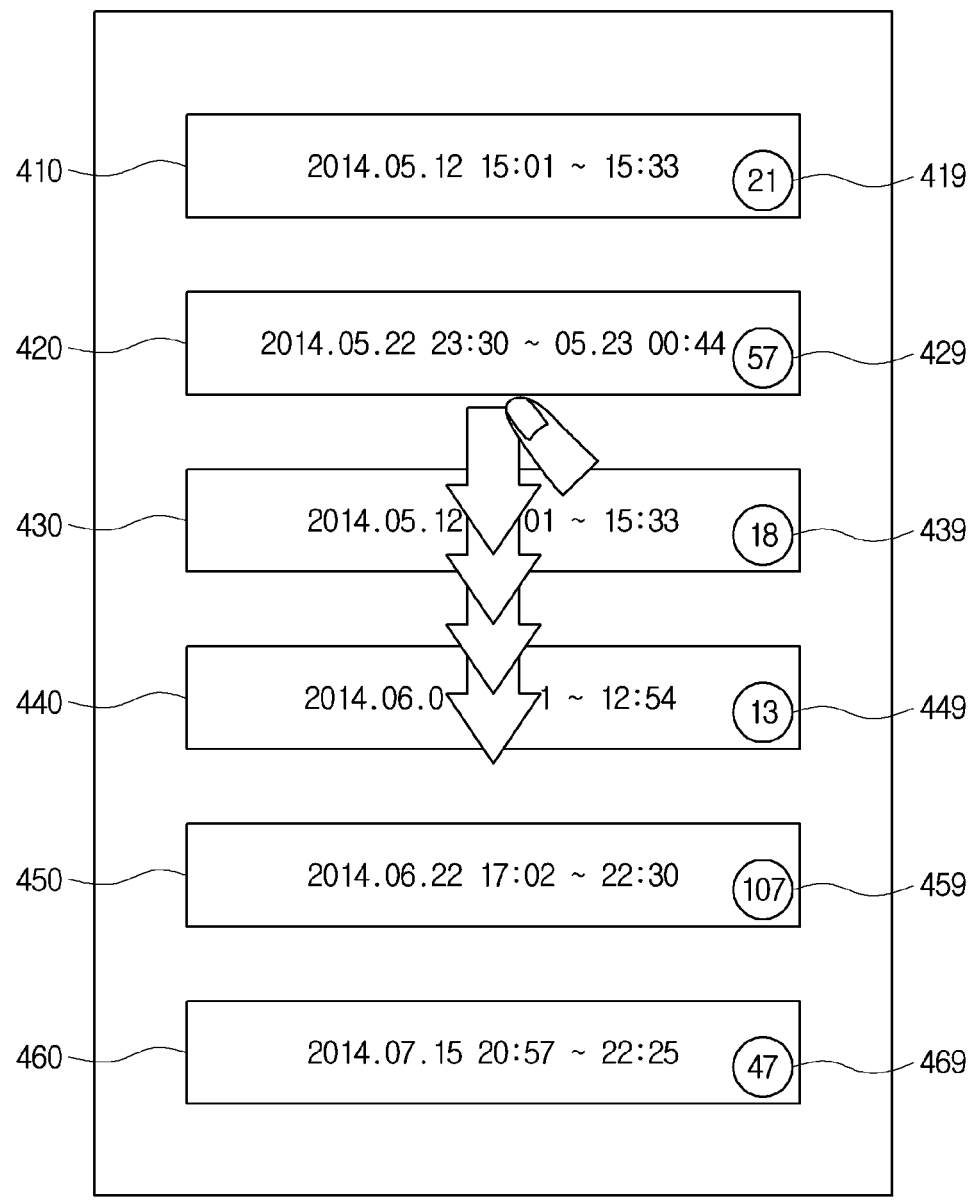
FIGS. 26 to 29 are exemplary views illustrating information windows corresponding to display steps according to an embodiment of the present invention.

As shown in FIG. 26, if one or more of the first scroll speed and the first elapsed time is detected, the controller 180 may display a plurality of information windows 410, 420, 430, 440, 450, and 460 in the first size. The controller 180 may display time information respectively corresponding to the plurality of information windows 410, 420, 430, 440, 450, and 460, and display message number icons 419, 429, 439, 449, 459, and 469 representing numbers of messages respectively corresponding to the plurality of information windows 410, 420, 430, 440, 450, and 460.

Figure 27:
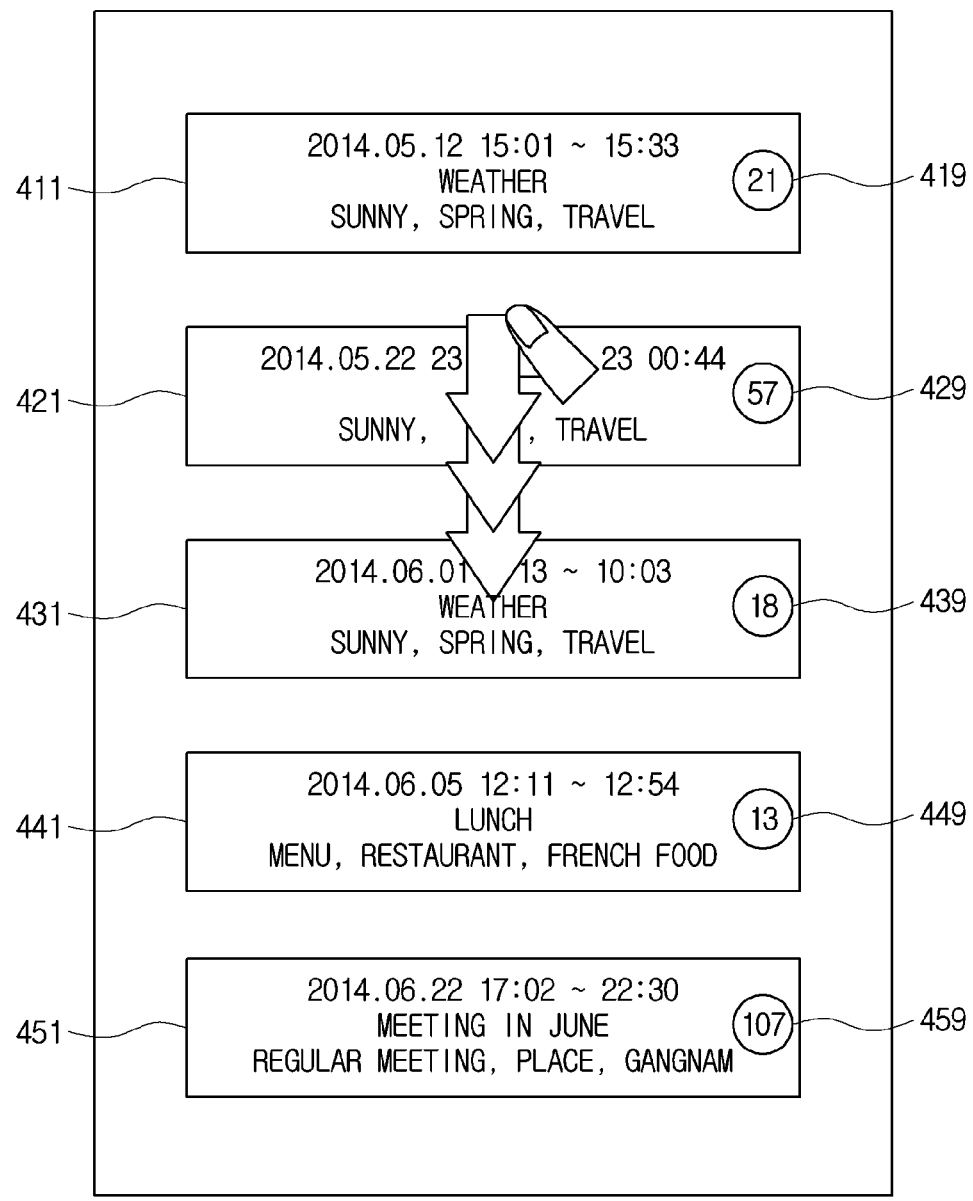

As shown in FIG. 27, if one or more of the second scroll speed and the second elapsed time is detected, the controller 180 may display a plurality of information windows 411, 421, 431, 441, and 451 in the second size. The controller 180 may display time information and main keyword information, respectively corresponding to the plurality of information windows 411, 421, 431, 441, and 451, and display message number icons 419, 429, 439, 449, and 459 representing numbers of messages respectively corresponding to the plurality of information windows 411, 421, 431, 441, and 451.

Figure 28:
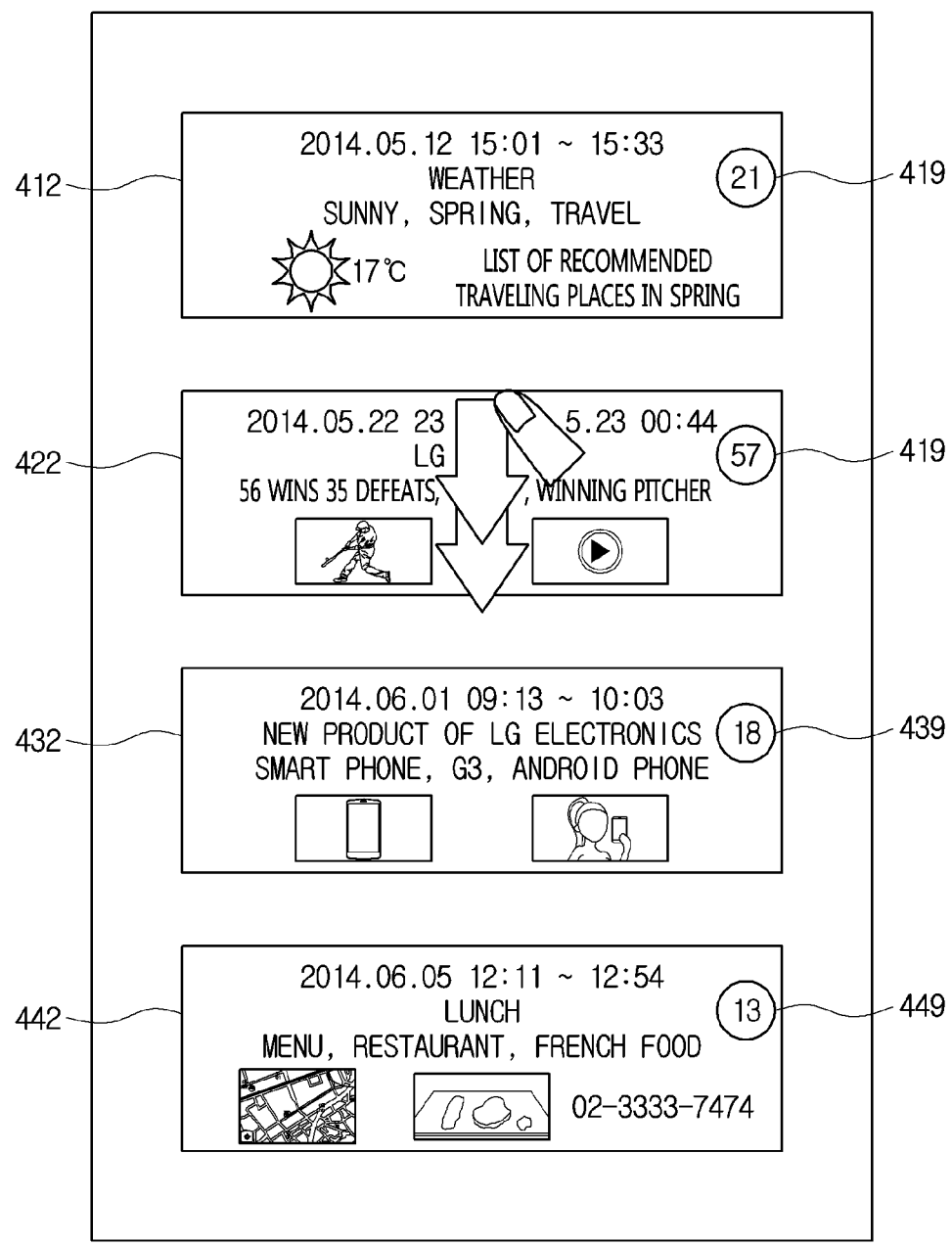

As shown in FIG. 28, if one or more of the third scroll speed and the third elapsed time is detected, the controller 180 may display a plurality of information windows 412, 422, 432, and 442 in the third size. The controller 180 may display time information, main keyword information, related icons, related images, and related web page links, respectively corresponding to the plurality of information windows 412, 422, 432, and 442, and display message number icons 419, 429, 439, and 449 representing numbers of messages respectively corresponding to the plurality of information windows 412, 422, 432, and 442.

Figure 29:
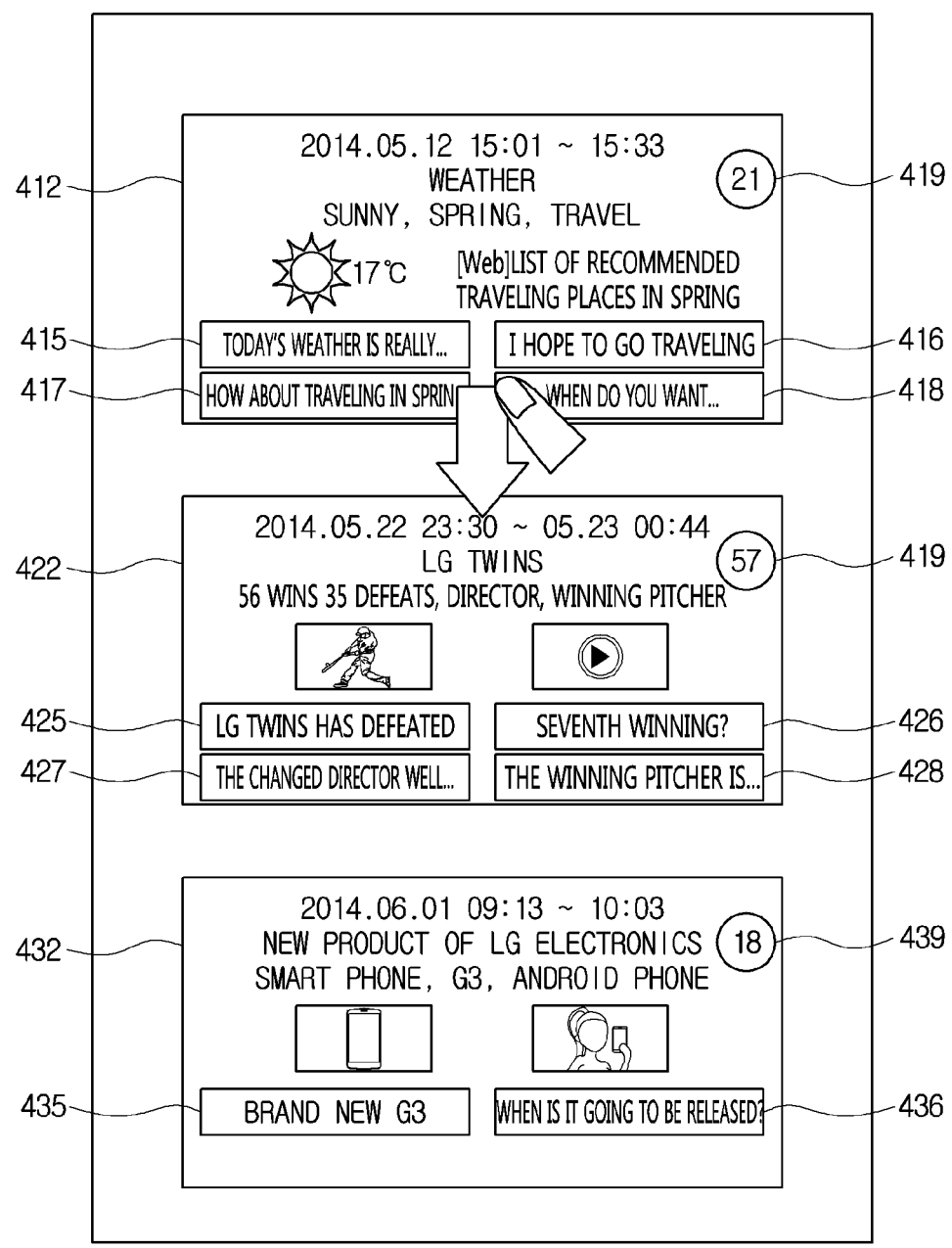

As shown in FIG. 29, if one or more of the fourth scroll speed and the fourth elapsed time is detected, the controller 180 may display a plurality of information windows 413, 423, and 433 in the fourth size. The controller 180 may display time information, main keyword information, related icons, related images, related web page links, and main messages, respectively corresponding to the plurality of information windows 413, 423, and 433, and display message number icons 419, 429, and 439 representing numbers of messages respectively corresponding to the plurality of information windows 413, 423, and 433.

Here, among the first to fourth scroll speeds, the first scroll speed may be the fastest scroll speed, and the fourth scroll speed may be the slowest scroll speed. In addition, among the first to fourth elapsed times, the first elapsed time is the shortest time, and the fourth elapsed time may be the longest time.

The display step corresponding to one or more of the scroll speed and the elapsed time is merely an example for description. However, the present invention is not limited thereto, and the display step corresponding to one or more of the scroll speed and the elapsed time may be variously set according to selections of a user or a designer.

In addition, the display of messages, message windows, and information windows, corresponding to the above-described steps S101 to S115, may be displayed as a display step corresponding to one or more of the scroll speed and the elapsed time.

As described above, the terminal 100 according to the present invention can provide the user with previous conversation information and recommendation information, corresponding to displayed one or more messages. Accordingly, the user can receive various information related to conversations with another user.

Further, the terminal 100 according to the present invention can display different display degrees of information provided based on one or more a scroll speed of the user and an elapsed time of a displayed screen. Accordingly, the user can change display degrees of a plurality of information displayed on a screen of the terminal 100 depending on interest degrees of the user, so that information that the user desires to search can be easily searched.

The present invention mentioned in the foregoing description may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments are merely exemplary and are not to be considered as limiting the present invention. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

The invention claimed is:

1. A method for operating a terminal, the method comprising:
    displaying at least one message of a current conversation with a third party on a first layer of a screen;
    acquiring at least one message content included in the displayed at least one message; acquiring terminal information of the terminal, the terminal information including information on one or more of a geographical location of the terminal, an application executed through the terminal, a web page opened through the terminal, another device connected to the terminal, an environment of an area in which the terminal is located, an emotion according to a facial expression of a user of the terminal, or information related to a current state and operation of the terminal;
    acquiring one or more of previous conversation information on at least one previous message content of at least one previous conversation with the third party that is not currently displayed, wherein the at least one previous message content corresponds to at least one of the at least one acquired message content or the acquired terminal information; and
    displaying one or more information windows regarding the acquired one or more of the previous conversation information on a second layer of the screen along with the at least one message of the current conversation displayed on the first layer of the screen,
    wherein the displaying the one or more information windows comprises:
    detecting at least one of a scroll speed or a display time of the screen of the displayed one or more information windows;
    determining an information type of information to be included in the one or more information windows and a window size of the one or more information windows based on the detected at least one of the scroll speed or the display time; and
    displaying the one or more information windows based on at least one of the determined information type or the determined window size.

2. The method according to claim 1, wherein the terminal information further includes information on one or more of a message transmission/reception time or a message check time.

3. The method according to claim 1, wherein:
    the acquiring one or more of the previous conversation information comprises acquiring recommendation information related to the acquired message content based on a keyword included in the displayed at least one message; and
    the displaying the one or more information windows further comprises displaying one or more information windows regarding the acquired one or more of the previous conversation information and the acquired recommendation information related to the acquired message content.

4. The method according to claim 3, wherein the displaying one or more information windows regarding the acquired one or more of the previous conversation information and the acquired recommendation information comprises displaying a previous conversation information window regarding the acquired one or more of the previous conversation information and a recommendation information window regarding the acquired recommendation information along with the displayed at least one message.

5. The method according to claim 4, wherein the previous conversation information window includes one or more of time information on the acquired one or more of the previous conversation information, a main keyword on the acquired one or more of the previous conversation information, a number of messages included in the acquired one or more of the previous conversation information, or category information corresponding to the acquired one or more of the previous conversation information.

6. The method according to claim 4, further comprising:
acquiring a user input for displaying detail information regarding the one or more of the previous conversation information window and the recommendation information window; and
displaying the detail information regarding the one or more of the previous conversation information window and the recommendation information window in response to the acquired user input.

7. The method according to claim 6, wherein the displaying the detail information regarding the one or more of the previous conversation information window and the recommendation information window comprises displaying message contents included in the acquired previous conversation information corresponding to the previous conversation information window.

8. The method according to claim 1, further comprising:
storing the acquired terminal information of the terminal corresponding to the at least one message.

9. A terminal comprising:
a wireless communication unit;
a display unit;
a sensor configured to sense at least one of information on the terminal, peripheral environment information of the terminal, or information about a user of the terminal; and
a controller operably coupled with the wireless communication unit, the display unit, and the sensor and configured to:
cause the display unit to display at least one message of a current conversation with a third party on a first layer of a screen,
acquire at least one message content included in the displayed at least one message,
acquire terminal information of the terminal, the terminal information including information on one or more of a geographical location of the terminal, an application executed through the terminal, a web page opened through the terminal, another device connected to the terminal, an environment of an area in which the terminal is located, an emotion according to a facial expression of a user of the terminal, or information related to a current state and operation of the terminal,
acquire one or more of previous conversation information on at least one previous message content of at least one previous conversation with the third party that is not currently displayed, wherein at least one previous message content corresponds to at least one of the acquired at least one message content or the acquired terminal information, and
cause the display unit to display one or more information windows regarding the acquired one or more of the previous conversation Information on a second layer of the screen while the at least one message of the current conversation is displayed on the first layer of the screen,
wherein the displaying the one or more information windows comprises:
detecting at least one of a scroll speed or a display time of the screen of the displayed one or more information windows;
determining an information type of information to be included in the one or more information windows and a window size of the one or more information windows based on the detected at least one of the scroll speed or the display time; and
displaying the one or more information windows based on at least one of the determined information type or the determined window size.

10. The terminal according to claim 9, wherein the terminal information further includes information on one or more of a message transmission/reception time or a message check time.

11. The terminal according to claim 9, wherein the controller is further configured to:
acquire recommendation information related to the acquired message content based on a keyword included in the displayed at least one message; and
cause the display unit to display one or more information windows regarding the acquired one or more of the previous conversation information and the acquired recommendation information related to the acquired message content.

12. The terminal according to claim 11, wherein the controller is further configured to cause the display unit to display a previous conversation information window regarding the acquired one or more of the previous conversation information and a recommendation information window regarding the acquired recommendation information while the at least one message is displayed on the display unit.

13. The terminal according to claim 12, wherein the previous conversation information window includes one or more of time information on the acquired one or more of the previous conversation information, a main keyword on the acquired one or more of the previous conversation information, a number of messages included in the acquired one or more of the previous conversation information, or category information corresponding to the acquired one or more of the previous conversation information.

14. The terminal according to claim 12, wherein the controller is further configured to:
acquire a user input for displaying detail information regarding the one or more of the previous conversation information window and the recommendation information window, and
cause the display unit to display the detail information regarding the one or more of the previous conversation information window and the recommendation information window in response to the acquired user input.

15. The terminal according to claim 14, wherein the controller is further configured to cause the display unit to display message contents included in the acquired previous conversation information corresponding to the previous conversation information window.

16. The terminal according to claim 9, further comprising a memory, wherein the controller is further configured to cause the memory to store the acquired terminal information of the terminal corresponding to the at least one message.

17. The method according to claim 1, wherein the at least one previous message content corresponds to the at least one acquired message content.

18. The method according to claim 1, wherein the terminal information includes information on the application executed through the terminal.

19. The method according to claim 1, wherein the terminal information includes information on the web page opened through the terminal.

20. The method according to claim 1, wherein the terminal information includes information on the environment of the area in which the terminal is located.

21. The method according to claim 1, wherein the terminal information includes information on the emotion according to the facial expression of the user of the terminal.

22. A machine-readable non-transitory medium having stored thereon machine-executable instructions for operating a terminal, the instructions comprising:
- displaying at least one message of a current conversation with a third party on a first layer of a screen;
- acquiring at least one message content included in the displayed at least one message;
- acquiring terminal information of the terminal, the terminal information including information on one or more of a geographical location of the terminal, an application executed through the terminal, a web page opened through the terminal, another device connected to the terminal, an environment of an area in which the terminal is located, an emotion according to a facial expression of a user of the terminal, or information related to a current state and operation of the terminal:
- acquiring one or more of previous conversation information on at least one previous message content of at least one previous conversation with the third party that is not currently displayed, wherein the at least one previous message content corresponds to at least one of the at least one acquired message content or the acquired terminal information; and
- displaying one or more information windows regarding the acquired one or more of the previous conversation information on a second layer of the screen along with the at least one message of the current conversation displayed on the first layer of the screen,
- wherein the displaying the one or more information windows comprises:
  - detecting at least one of a scroll speed or a display time of the screen of the displayed one or more information windows;
  - determining an information type of information to be included in the one or more information windows and a window size of the one or more information windows based on the detected at least one of the scroll speed or the display time; and
  - displaying the one or more information windows based on at least one of the determined information type or the determined window size.

* * * * *